United States Patent
Tomi

(10) Patent No.: US 8,924,762 B2
(45) Date of Patent: Dec. 30, 2014

(54) DATA PROCESSING APPARATUS AND POWER CONSUMPTION AMOUNT MANAGEMENT METHOD

(75) Inventor: Hideyasu Tomi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 673 days.

(21) Appl. No.: 13/275,749

(22) Filed: Oct. 18, 2011

(65) Prior Publication Data

US 2012/0102351 A1 Apr. 26, 2012

(30) Foreign Application Priority Data

Oct. 22, 2010 (JP) .................................. 2010-237100

(51) Int. Cl.
*G06F 1/26* (2006.01)
*G06F 1/32* (2006.01)

(52) U.S. Cl.
CPC ........... *G06F 1/3284* (2013.01); *Y02B 60/1267* (2013.01)
USPC ........... 713/340; 713/300; 713/320; 713/330; 714/22; 702/61

(58) Field of Classification Search
CPC ..... G06F 1/3215; G06F 1/325; G06F 1/3284; G06F 3/1221; G06F 3/1273; G06F 11/3062; G06F 11/3466
USPC ........ 713/300, 320, 330, 340; 714/22; 702/61
See application file for complete search history.

(56) References Cited

U.S. PATENT DOCUMENTS 8,095,338 B2 * 1/2012 Harada et al. ................. 702/182

FOREIGN PATENT DOCUMENTS

| JP | H08-104044 A | 4/1996 |
| JP | 2002-006696 A | 1/2002 |
| JP | 2003-335026 A | 11/2003 |
| JP | 2007-295433 A | 11/2007 |

* cited by examiner

*Primary Examiner* — Michael J Brown

(74) *Attorney, Agent, or Firm* — Canon USA, Inc. IP Division

(57) ABSTRACT

A data processing apparatus includes an input unit configured to input a job to be executed by the data processing apparatus, a processing unit configured to process the job input by the input unit, a power measurement unit configured to make power measurement of the data processing apparatus, and a storage unit configured to store a measurement time of the power consumption by the power measurement unit.

10 Claims, 19 Drawing Sheets

DATA PROCESSING APPARATUS AND POWER CONSUMPTION AMOUNT MANAGEMENT METHOD

BACKGROUND OF THE INVENTION

1. Field of the Invention

Embodiments of the present invention relate to a data processing apparatus and a power consumption amount management method.

2. Description of the Related Art

In recent years, the reduction of a power consumption amount when a data processing apparatus such as a printer and multifunction peripheral is used is demanded to reduce the amount of emission of greenhouse gases such as carbon dioxide. Thus, enabling a user to recognize a power consumption amount when a device is used is demanded. It is also necessary to measure a power consumption amount in jobs such as printing and copying executed by each user with high precision and to present the measurement result to the user to promote user's behavior to reduce a power consumption amount.

Japanese Patent Application Laid-Open No. 2003-335026 discusses a technology that sends out data on a power consumption amount measured by each copying machine in response to a request of a management apparatus in a system in which a plurality of copying machines (data processing apparatuses) capable of measuring power consumption and the management apparatus are connected to a network. According to the technology, the management apparatus may grasp, for example, the history of a power consumption amount of each copying machine for each month in a centralized manner. Further, the copying machine determines, at regular intervals, whether job processing is being performed and a power consumption amount of the copying machine for each job may be calculated and measured with high precision by integrating the measured power consumption amount as a power consumption amount for each job.

However, if the data processing apparatus determines, at regular intervals, whether a job is being executed, as discussed in Japanese Patent Application Laid-Open No. 2003-335026, the operation rate of the data processing apparatus increases, making the processing time of other processing performed by the data processing apparatus longer. Thus, the reduction of a power consumption amount of the data processing apparatus may be prevented.

SUMMARY OF THE INVENTION

One disclosed aspect of the embodiments of the present invention is directed to a method of calculating and measuring a power consumption amount of a data processing apparatus for each job with high precision without the need for the data processing apparatus to determine, at regular intervals, whether a job is being executed.

According to an aspect of the embodiments, a data processing apparatus includes an input unit configured to input a job to be executed by the data processing apparatus, a processing unit configured to process the job input by the input unit, a power measurement unit configured to measure power consumption of the data processing apparatus, a storage unit configured to store a measurement time of the power consumption by the power measurement unit, a control unit configured to calculate first power consumption information indicating a power consumption amount, obtained while processing by the processing unit is not performed, by using the power consumption measured by the power measurement unit when the processing of the job by the processing unit is started and an elapsed time from the measurement time when the processing of a processed job processed immediately before is finished to the measurement time when the processing of the job is started, and to calculate second power consumption information indicating a power consumption amount, obtained during the processing of the job, by using the power consumption measured by the power measurement unit when the processing of the job is finished and an elapsed time from the measurement time when the processing of the job is started to the measurement time when the processing of the job is finished, and a job history management unit configured to manage the first power consumption information and the second power consumption information calculated by the control unit.

Further features and aspects of the embodiments will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention. One disclosed feature of the embodiments may be described as a process which is usually depicted as a flowchart, a flow diagram, a timing diagram, a structure diagram, or a block diagram. Although a flowchart or a timing diagram may describe the operations or events as a sequential process, the operations may be performed, or the events may occur, in parallel or concurrently. In addition, the order of the operations or events may be re-arranged. A process is terminated when its operations are completed. A process may correspond to a method, a program, a procedure, a method of manufacturing or fabrication, a sequence of operations performed by an apparatus, a machine, or a logic circuit, etc.

FIG. 15 is a schematic diagram illustrating the relationship between the power consumption of the image forming apparatus and the elapsed time between the start and the end of a job when a subsequent job is finished before a preceding job is finished.

DESCRIPTION OF THE EMBODIMENTS

Various exemplary embodiments, features, and aspects of the invention will be described in detail below with reference to the drawings.

Figure 1:
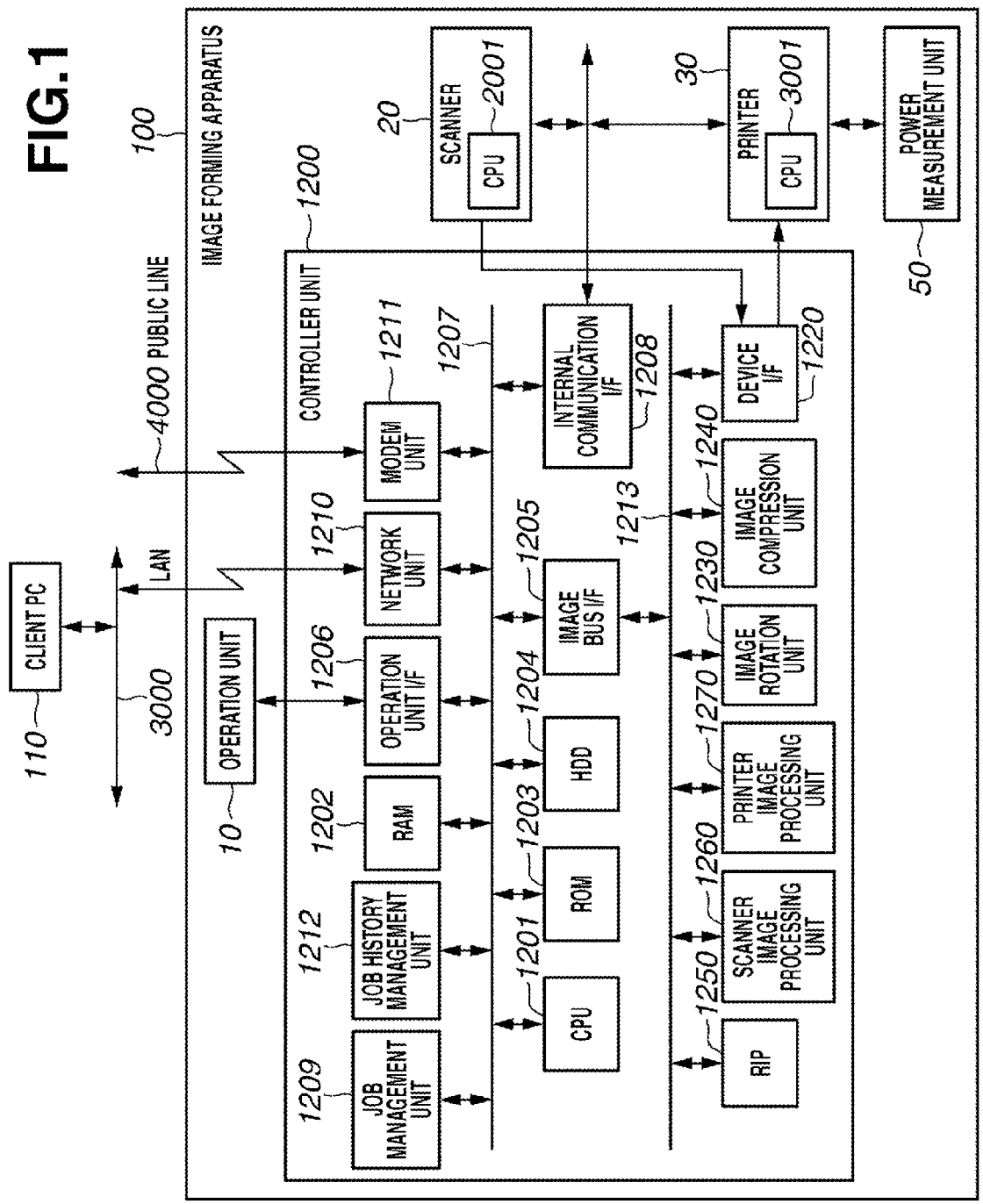
FIG. 1 is a diagram exemplifying the configuration of an image forming apparatus capable of calculating or measuring a power consumption amount according to a first exemplary embodiment of the present invention.

FIG. 1 is a diagram exemplifying the configuration of an image forming apparatus 100 as an example of a data processing apparatus capable of calculating or measuring a power consumption amount according to the first exemplary embodiment of the present invention.

The image forming apparatus 100 includes an operation unit 10 for a user using the image forming apparatus 100 to perform various operations, a scanner unit 20 that reads image information according to instructions from the operation unit 10, and a printer unit 30 that prints image data on paper.

The scanner unit 20 includes a central processing unit (CPU) 2001 that controls the scanner unit 20, an illumination lamp and scanning mirror (not illustrated) that are for reading a document, and the like. The printer unit 30 includes a CPU 3001 that controls the printer unit, and a photosensitive drum and fixing device (not illustrated) that are for forming and fixing an image. The printer unit 30 may be a printer using other printing methods such as an inkjet printer and dye-sub printer.

Further, the image forming apparatus 100 includes a power measurement unit 50 that measures power consumption of the image forming apparatus 100. The image forming apparatus 100 also includes a controller unit 1200 connected to the scanner unit 20, the printer unit 30, a local area network (LAN) 3000, and a public line (WAN) 4000 to control the operation of the image forming apparatus in a centralized manner. On the other hand, the controller unit 1200 performs input/output control of image information, device information, information about the power consumption amount, and the like.

Inner workings of the controller unit 1200 will be described in detail with reference to FIG. 1. The controller unit 1200 includes a raster image processor (RIP) 1250 that rasterizes, to a bitmap image, page description language (PDL) code contained in a print job received from a client computer (client PC) 110 in the LAN 3000 via the LAN.

The controller unit 1200 also includes a scanner image processing unit 1260 that corrects, processes, and edits image data input from the scanner unit 20. The controller unit 1200 also includes a printer image processing unit 1270 that processes a correction of image data output (printed) by the printer unit 30, a conversion of resolution thereof, and other process thereto, and an image rotation unit 1230 that rotates image data.

The controller unit 1200 also includes an image compression unit 1240 that performs compression/decompression processing of Joint Photographic Experts Group (JPEG) on multi-valued image data and Joint Bi-level Image Experts Group (JBIG), Modified Modified READ (MMR), or Modified Huffman (MH) on binary image data. The controller unit 1200 also includes a device interface (I/F) 1220 that makes synchronous/asynchronous conversion of image data by connecting the scanner unit 20 and the printer unit 30 to the controller unit 1200.

Further, the controller unit 1200 includes an image bus 1213 that transfers image data at high speed by mutually connecting the RIP 1250, the scanner image processing unit 1260, the printer image processing unit 1270, the image rotation unit 1230, the image compression unit 1240, and the device I/F 1220.

The controller unit 1200 also includes a CPU 1201 as a control unit that controls the image forming apparatus 100 in a centralized manner. The controller unit 1200 also includes a random access memory (RAM) 1202 that is a system work memory for the operation of the CPU 1201 and also an image memory to temporarily store image data. The controller unit 1200 also includes an operation I/F 1206 that is an interface with the operation unit 10 and outputs image data displayed in the operation unit 10 to the operation unit 10. The operation unit I/F 1206 also plays a role of conveying information input by the user who uses the image forming apparatus from the operation unit 10 to the CPU 1201.

The controller unit 1200 also includes a network unit 1210 connected to the LAN 3000 to communicate (send/receive) with the client PC 100 and other computer terminals (not illustrated) in the LAN 3000. The controller unit 1200 also includes a modem unit 1211 connected to the public line 4000 to communicate (send/receive) data with external facsimile apparatuses (not illustrated).

The controller unit 1200 also includes a read-only memory (ROM) 1203 in which a boot program executed by the CPU 1201 is stored and a hard disk drive (HDD) 1204 that stores system software, image data, a software counter value, and the like. The controller unit 1200 also includes an internal communication I/F 1208 that communicates with each of the scanner unit 20 and the printer unit 30.

The controller unit 1200 also includes a system bus 1207 that mutually connects the CPU 1201, the RAM 1202, the operation unit I/F 1206, the network unit 1210, the ROM 1203, the HDD 1204, the internal communication I/F 1208, and the like.

The controller unit 1200 also includes an image bus I/F 1205, which is a bus bridge that connects the bus system 1207 and the image bus 1213 to convert a data structure. The controller unit 1200 also includes a job management unit 1209 that analyzes a print or copy job and acquires output attribute information such as the user name, number of copies, color print, and the like to manage it as job information. The job information is acquired from the operation unit I/F 1206 if the job (for example, a copy job) is issued from the operation unit 10 and the job information is acquired from the network unit 1210 if the job (for example, a print job) is issued from the client PC 100 or other terminals.

Further, the controller unit 1200 includes a job history management unit 1212 that manages job history information. The job history management unit 1212 retains job information sent from the job management unit 1209 when a job is finished as a job history information table (FIG. 2).

Figure 2:
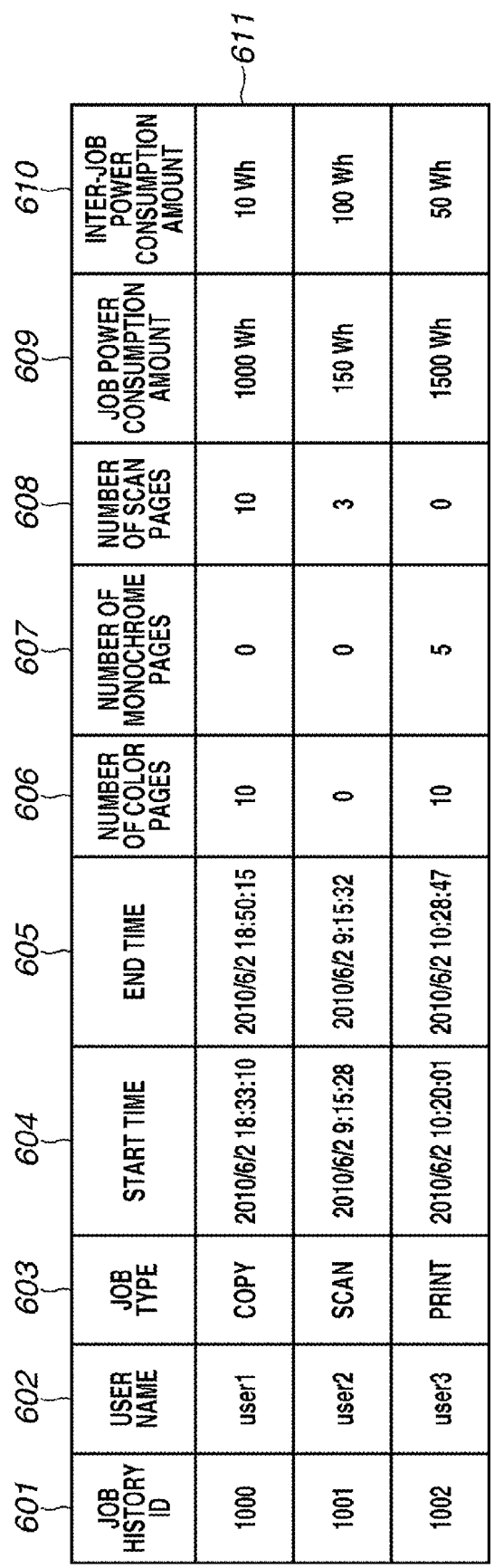
FIG. 2 is a diagram exemplifying a job history information table retained by a job history management unit.

FIG. 2 is a diagram exemplifying the job history information table retained by the job history management unit 1212. In FIG. 2, a job history ID 601 is an ID that uniquely identifies the job history. A user name 602 indicates the name of a user who has instructed execution of a job. A job type 603 indicates the type of an executed job and this includes a print job, copying, scan, and the like from the client PC 110.

A start time 604 indicates the start time of a job. An end time 605 indicates the end time of a job. A number of color pages 606 is the number of pages color-printed/copied by the job using the printer unit 30. A number of monochrome pages 607 is the number of pages monochrome-printed/copied by the job using the printer unit 30. A number of scanned pages 608 indicates the number of pages scanned by the job using the scanner unit 20, and the number of color-scanned pages, the number of monochrome-scanned pages, and the like may be recorded separately.

A job power consumption amount 609 indicates a power consumption amount consumed by the job. An inter-job power consumption amount 610 indicates a power consumption amount consumed between a job immediately before a relevant job and the relevant job.

The job history information table records job history information about who started and finished which job by consuming power of what Wh by the information 601 to 610. For example, a job history 611 shows that a copy job started at "2010/6/2_18:33:10" and finished at "2010/6/2_18:50:15" has been executed. Further, the job history 611 shows that 10 pages are scanned, color-printing of 10 pages is done, and 1000 Wh power is consumed.

The job history information table may be generated for each job type. Needless to say, the job management unit 1209 and the job history management unit 1212 need not be prepared individually and may also be realized by combining software executed by the CPU 1201 and a storage apparatus such as the HDD 1204.

Figure 3:
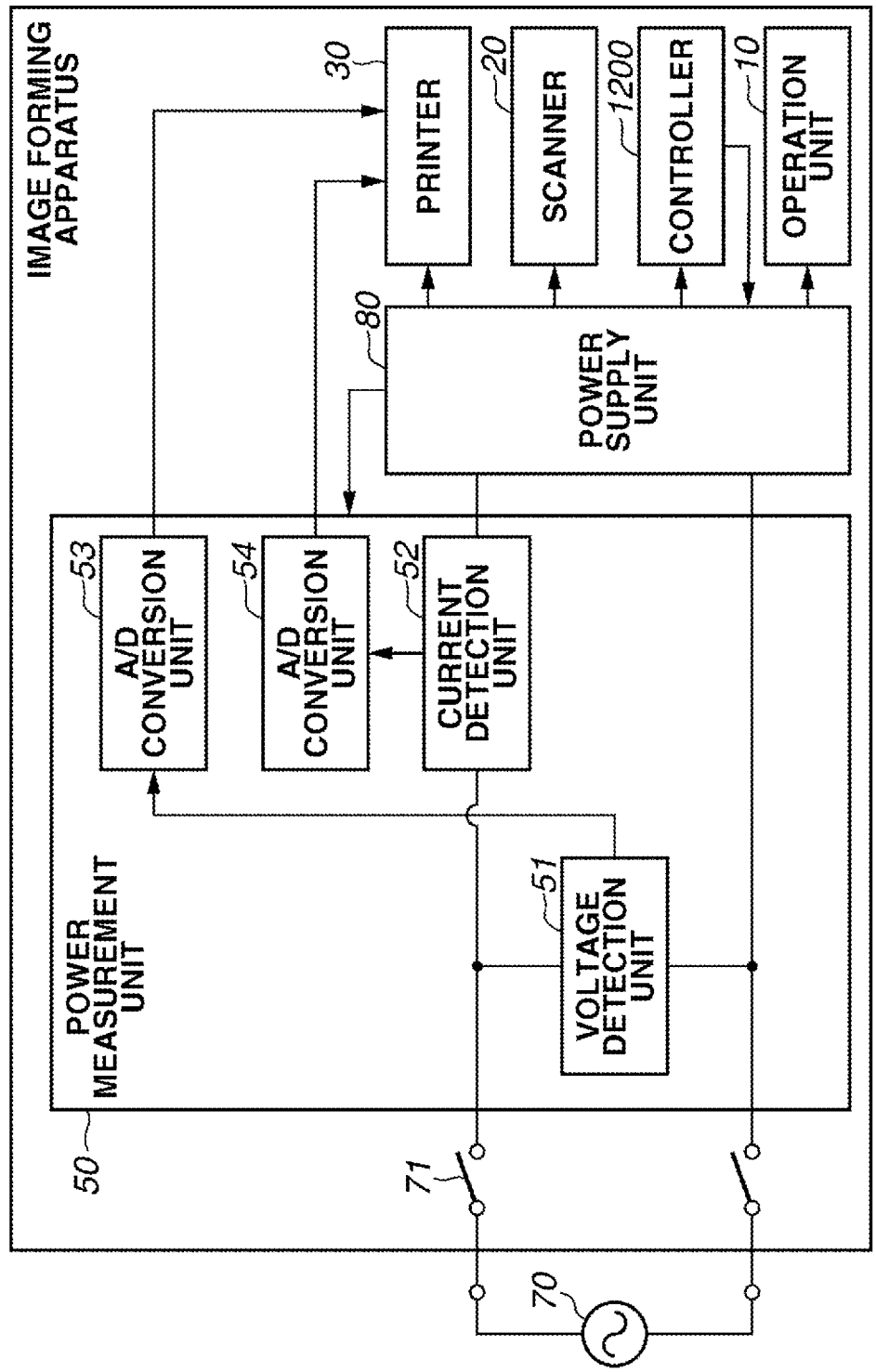
FIG. 3 is a diagram illustrating the configuration of power supply inside the image forming apparatus and a configuration example inside a power measurement unit.

FIG. 3 is a diagram illustrating the configuration of power supply inside the image forming apparatus 100 and a configuration example inside the power measurement unit 50.

In FIG. 3, a commercial power supply 70 is connected to a power supply unit 80 via a main power switch 71 and the power measurement unit 50. The power supply unit 80 internally generates power necessary for each unit of the image forming apparatus 100 such as the scanner unit 20, the printer unit 30, the power measurement unit 50, the controller unit 1200, and the operation unit 10 based on the commercial power supply 70 and supplies the generated power.

Next, the power measurement unit 50 will be described in detail with reference to FIG. 3. A voltage detection unit 51 and a current detection unit 52 are contained inside the power measurement unit 50 and read two values of the voltage and current respectively. Concrete detection of the voltage may be a method of full-wave rectifying L (line) and N (neutral) of a general commercial power supply, stepping down L and N by a transformer, and reading numeric values thereof by an A/D conversion unit 53. Concrete detection of the current may be a method of converting a current value flowing through L (line) into a magnetic flux, converting the magnetic flux into a voltage, and reading the voltage by an A/D conversion unit 54 or inserting a current value detection resistor and reading the current. Alternatively, a method of inserting an element whose temperature changes depending on the flowing current and reading the current may be used. The voltage level and current level that are detected by any of the above methods and A/D converted are input into the printer unit 30 in the present exemplary embodiment.

The voltage level and current level input into the printer unit 30 are read by the CPU 3001 inside the printer unit 30 and a result of multiplying the two values (voltage level×current level) is calculated as power consumption. Further, the CPU 3001 inside the printer unit 30 retains the times at which the above voltage level and current level were read in a storage apparatus (not illustrated) inside the printer unit 30 along with the calculated power consumption. Also, the CPU 3001 inside the printer unit 30 calculates a power consumption amount in a predetermined time by calculating power consumption×time from an elapsed time after the reading time immediately before (the reading time retained in the storage apparatus for the last reading). The power consumption amount calculated inside the printer unit 30 based on measurement results may be sent to the CPU 1201 inside the controller unit 1200 by communication of the printer unit 30 with the internal communication I/F 1208 inside the controller unit 1200. As another method, a digital signal processor (DSP) that performs operation processing of digital data at high speed may be mounted inside the power measurement unit 50 to calculate the power consumption amount inside the power measurement unit 50. In that case, the power measurement unit 50 may directly be connected to the controller unit 1200 via the internal communication I/F 1208. Further, power consumption measured by the power measurement unit 50 may be calculated by the CPU 3001 inside the printer unit 30 and the power consumption amount may be calculated by the CPU 1201 of the controller unit 1200.

Figure 4:
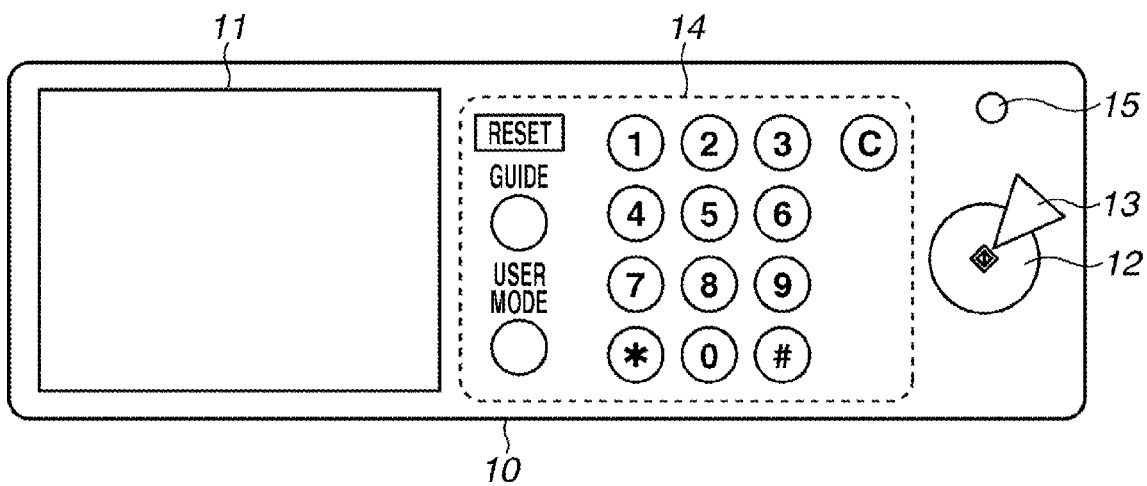
FIG. 4 is a diagram illustrating a configuration example of an operation unit.

FIG. 4 is a diagram illustrating a configuration example of the operation unit 10. In FIG. 4, a liquid crystal operation panel 11 is a combination of a liquid crystal and a touch panel and displays an operation screen and, when a display key is pressed by the user, sends information thereof to the controller unit 1200.

A start key 12 is used when an operation of reading/printing a document image is started or the start of other functions is instructed. LEDs of two colors of green and red are embedded in the start key 12 and green lighting indicates readiness to start and red lighting indicates non-readiness to start. A stop key 13 works to stop an active operation.

A numeric keypad, clear key, reset key, guide key, and user mode key are provided in a hard key group 14. A power-saving key 15 is used when the image forming apparatus enters the sleep mode or the image forming apparatus is returned from the sleep mode. The image forming apparatus enters the sleep mode when the power-saving key 15 is pressed by the user in normal mode and enters the normal mode when the power-saving key 15 is pressed by the user in sleep mode.

The operation unit 10 sends to the operation unit I/F 1206 information necessary for job information creation such as the user name, number of printed sheets/copies, and output attribute information input by the user using the liquid crystal operation panel 11.

Figure 5:
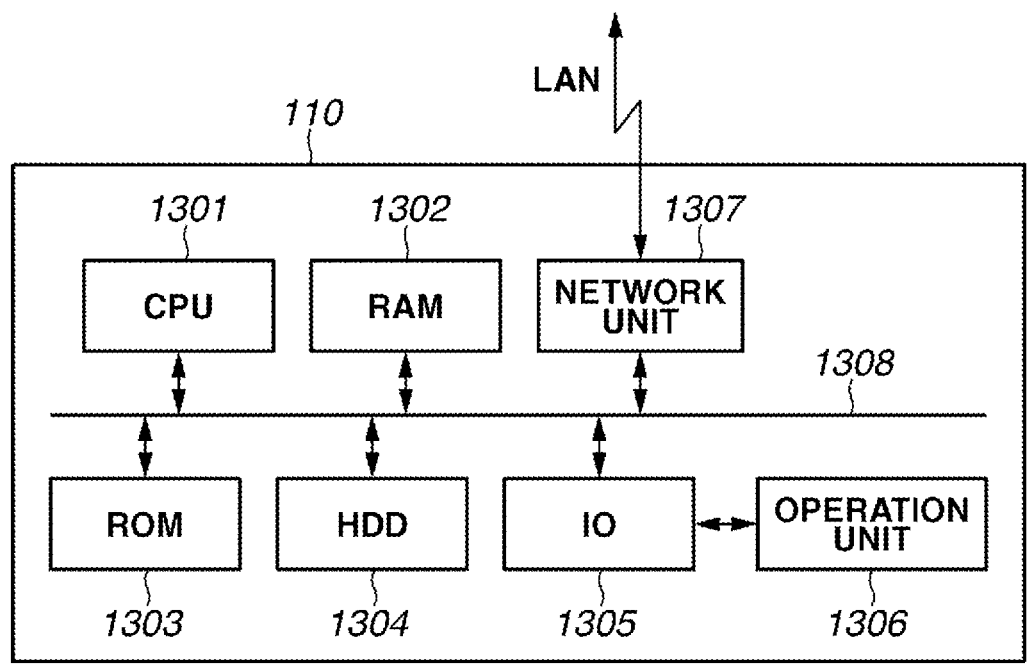
FIG. 5 is a hardware configuration diagram of a client personal computer (PC).

FIG. 5 is a diagram exemplifying the hardware configuration diagram of the client PC 110. In FIG. 5, the client PC 110 is configured to include a CPU 1301, a RAM 1302, a ROM 1303, an HDD 1304, a network unit 1307, an IO unit 1305, and an operation unit 1306 mutually connected by a system bus 1308.

The CPU 1301 provides various functions by reading programs such as the operating system (OS) and application software from the HDD 1304 and executing the programs. The RAM 1302 is a system work memory used when the CPU 1301 executes programs. The ROM 1303 stores programs to activate Basic Input/Output System (BIOS) and OS and setting files.

The HDD 1304 is a hard disk drive and stores system software and the like. The network unit 1307 is connected to the LAN 3000 to communicate (send/receive) with external devices such as the image forming apparatus 100. The IO unit 1305 is an interface to input/output information into/from the operation unit 1306 constituted of input/output devices such as a liquid crystal display and mouse (not illustrated). Predetermined information is displayed in a liquid crystal display of the operation unit 1306 in predetermined resolution, the number of colors, and the like based on screen information instructed by a program. For example, a graphical user interface (GUI) screen is formed and various windows necessary for operation and data are displayed.

Figure 6:
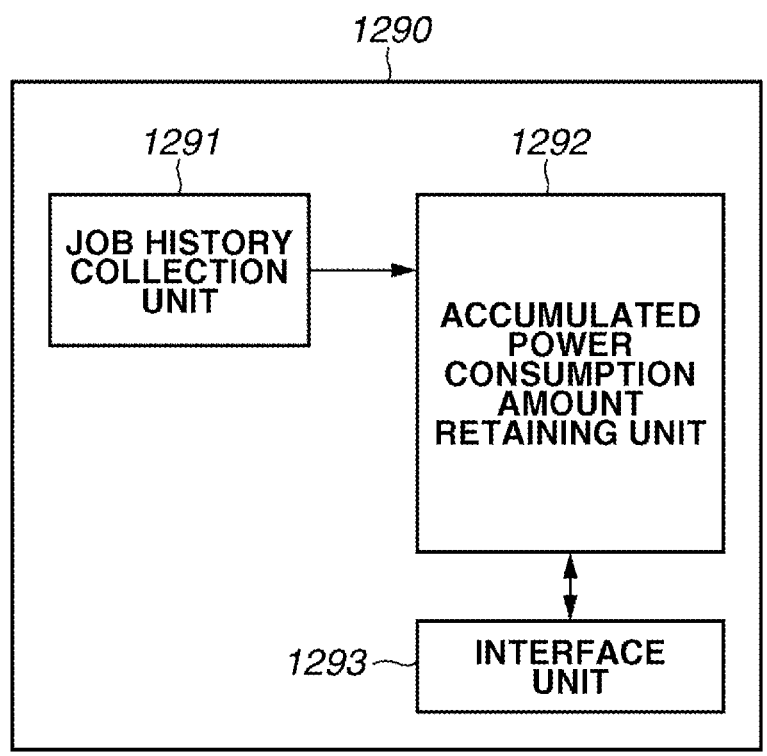
FIG. 6 is a software configuration diagram exemplifying a power consumption amount management program executed by the image forming apparatus.

FIG. 6 is a software configuration diagram exemplifying a power consumption amount management program 1290 executed by the image forming apparatus 100. The program is stored in the HDD 1204 together with a job control program which executes jobs such as printing and copying, and the like. These programs are read from the HDD 1204 into the RAM 1202 by the boot program being executed by the CPU 1201. Then, the CPU 1201 executes the program read into the RAM 1202 for processing.

In the power consumption amount management program 1290 in FIG. 6, a job history collection unit 1291 acquires (collects) and retains a job history information table (FIG. 2) managed by the job history management unit 1212. An accumulated power consumption amount retaining unit 1292 reads the job power consumption amount 609 and the inter-job power consumption amount 610 from the job history information table retained in the job history collection unit 1291 and calculates a total power consumption amount (accumulated power consumption amount) from the above power consumption amounts and to retain the total power consumption amount. Regarding the accumulated power consumption amount calculated by the accumulated power consumption amount retaining unit 1292, power consumption amounts may be accumulated in various ways such as power consumption amounts for all users or a specified user for each hour or job in a specified period according to instructions from the user.

An interface unit 1293 reads the total power consumption amount retained by the accumulated power consumption amount retaining unit 1292 to display the total power consumption amount on the liquid crystal operation panel 11 of the operation unit 10. The interface unit 1293 also performs control to output the total power consumption amount to the client PC 110 or other external devices connected to the LAN 3000 via the network unit 1210.

Next, print job execution by an image forming apparatus and an update flow of power consumption amount information according to the present exemplary embodiment will be described.

First, the flow of execution of a print job will be described. The image forming apparatus 100 (FIG. 1) performs print processing as described below based on a print job sent from the client PC 110 connected to the LAN 3000. When a print job is received, the CPU 1201 notifies the printer unit 30 of the start of the job via the internal communication I/F 1208.

Following the notification of the start of the job, the CPU 3001 of the printer unit 30 performs control to make the printer unit 30 ready for printing. The CPU 1201 causes the RAM 1202 to store print data, which is image data received from the client PC 110 connected to the LAN 3000 via the network unit 1210. Then, the CPU 1201 supplies the image data to the RIP 1250 via the image bus I/F 1205.

The RIP 1250 rasterizes the image data (PDL code) to bitmap data. The image compression unit 1240 performs compression processing on the bitmap data rasterized by the RIP 1250 and integrates the compressed bitmap data in the HDD 1204. Next, the image data (compressed bitmap data) accumulated in the HDD 1204 is supplied to the image compression unit 1240 via the image bus I/F 1205.

The image compression unit 1240 decompresses the supplied image data (compressed bitmap data). The printer image processing unit 1270 makes printer corrections, resolution conversion, and the like on the decompressed image data. The image rotation unit 1230 performs rotation processing on image data if necessary. Subsequently, image data on which various kinds of processing have been performed is sent to the printer unit 30 via the device I/F 1220 as print data and print processing thereof is performed on paper by the printer unit 30.

Further, the CPU 1201 notifies the printer unit 30 of the end of the job via the internal communication I/F 1208. Following the notification of the end of the job, the CPU 3001 of the printer unit 30 performs control to make the printer unit 30 ready for finishing printing.

Figure 7:
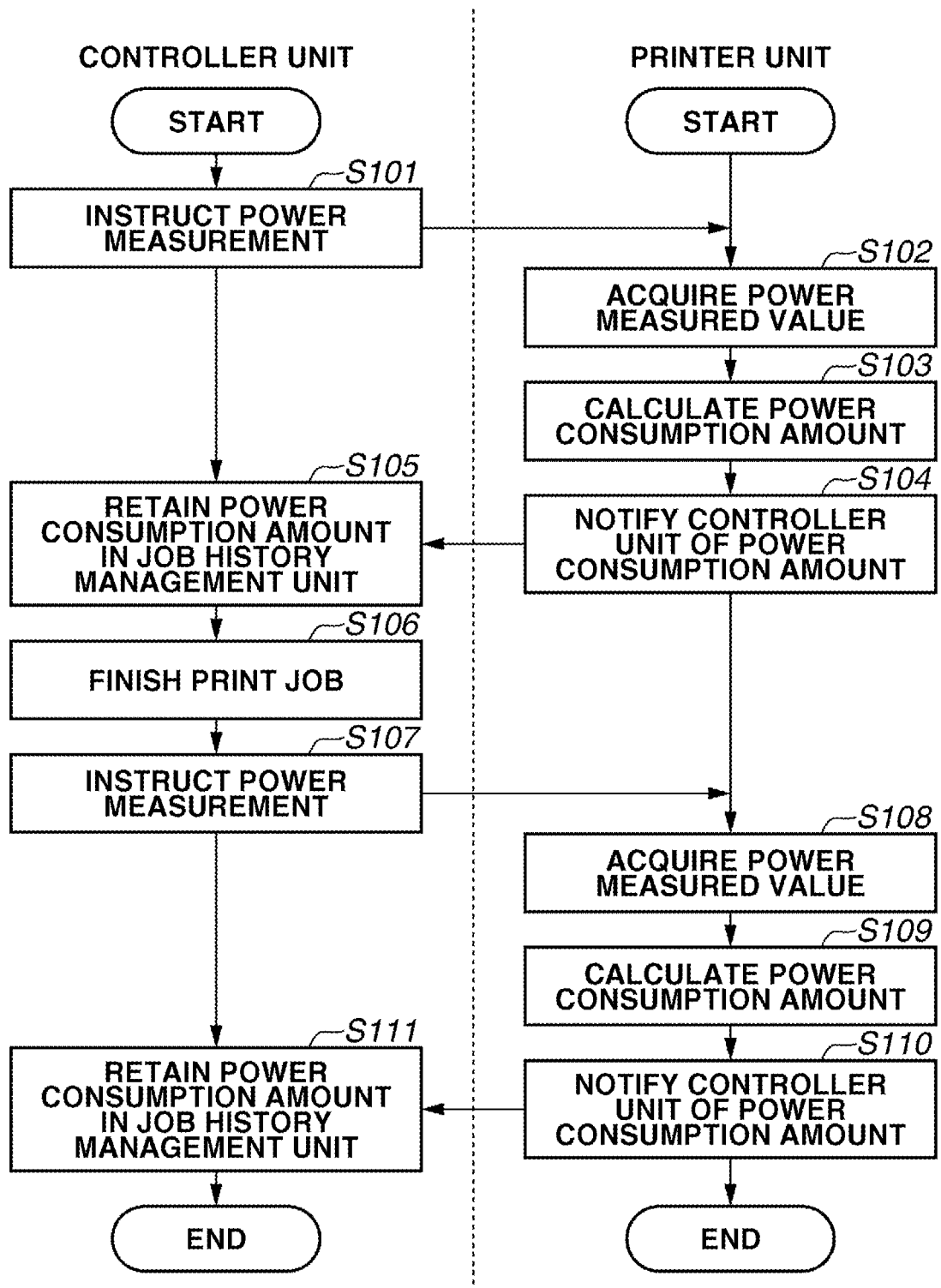
FIG. 7 is a flow chart illustrating processing timing of print job execution and power consumption amount measurement according to the first exemplary embodiment.

FIG. 7 is a flow chart illustrating processing timing of print job execution and power consumption amount measurement according to the first exemplary embodiment. Processing on the side of the controller unit 1200 in FIG. 7 is realized by a program computer-readably recorded in the HDD 1204 being read and executed by the CPU 1201 of the controller unit 1200. Processing on the side of the printer unit 30 is realized by a program computer-readably recorded in a ROM (not illustrated) or the like being read and executed by the CPU 3001 of the printer unit 30.

First, when a print job is received, in operation S101, the CPU 1201 of the controller unit 1200 starts the print job and notifies the printer unit 30 of the start of the job via the internal communication I/F 1208 and at the same time, instructs the printer unit 30 to make power measurement. The received job is managed by the job history management unit 1212 and job information of the job is retained in a job history information table (FIG. 2).

In operation S102, the CPU 3001 of the printer unit 30, which has received the instruction of power measurement, acquires measured values (voltage and current levels) of the power measurement unit 50. The acquisition of measured values by the CPU 3001 of the printer unit 30 may occur when a predetermined time passes after reception of the instruction of power measurement. Even if a job is started, power before the job is started may be acquired without being affected by the job if the time after starting the job is within a specified time (depending on the type of apparatus). The CPU 3001 of the printer unit 30 stores the acquisition times of the measured values in a storage apparatus (not illustrated) inside the printer unit 30.

After the measured values are acquired, the CPU 3001 of the printer unit 30 calculates power consumption by multiplying the voltage level and the current level (voltage level× current level) acquired in operation S102 described above. The CPU 3001 of the printer unit 30 also calculates an elapsed time from the time when a power measured value is acquired immediately before (last measured value acquisition time) to the execution time of operation S102 described above. Further, in operation S103, the CPU 3001 of the printer unit 30 calculates information (first power consumption information) indicating the power consumption amount between jobs in which no job processing is performed by multiplying the above-calculated power (power consumption) and the time (elapsed time) (power×time). The time when the power measured value is acquired immediately before, that is, the measured value acquisition time when the job processed immediately before is finished is retained, as described above, in a storage apparatus (not illustrated) of the printer unit 30. If, like when the first job after power-on is executed, the last measured value acquisition time is not retained, the elapsed time may be calculated as an elapsed time after power-on.

Further, in operation S104, the CPU 3001 of the printer unit 30 notifies the CPU 1201 of the controller unit 1200 of information indicating the power consumption amount (set as a power consumption amount 1-1) calculated in operation S103 described above via the internal communication I/F 1208.

Figure 8:
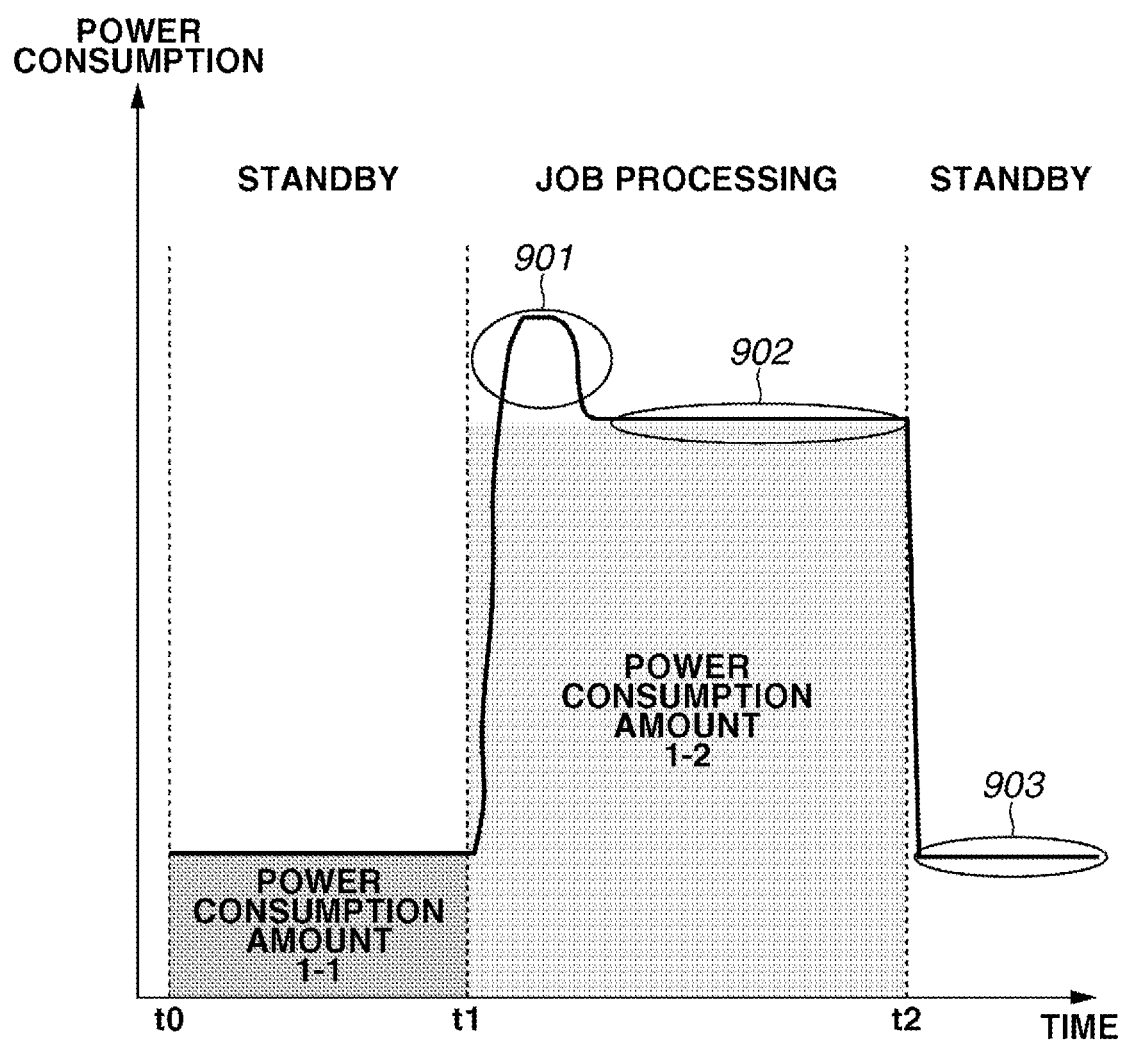
FIG. 8 is a schematic diagram illustrating a relationship between power consumption of the image forming apparatus and an elapsed time between the start and the end of a job.

FIG. 8 is a schematic diagram illustrating a relationship between power consumption of the image forming apparatus and the elapsed time between the start and the end of a job. The power consumption amount 1-1 illustrated in FIG. 8 is the power consumption amount 1-1 of which the controller unit 1200 is notified from the printer unit 30 in operation S104 described above. In operation S105, the CPU 1201 of the controller unit 1200 retains information indicating the power consumption amount 1-1 in an applicable job history of the job history information table of the job history management unit 1212 as the power consumption amount (an inter-job power consumption amount 610) consumed by the image forming apparatus between jobs.

Then, in operation S106, if the CPU 1201 of the controller unit 1200 determines that the print job is finished, then in operation S107, the CPU 1201 of the controller unit 1200 notifies the printer unit 30 of the end of the job via the internal communication I/F 1208 and at the same time, instructs the printer unit 30 to make power measurement.

In operation S108, the CPU 3001 of the printer unit 30, which has received the instruction of power measurement, acquires measured values (voltage and current levels) of the power measurement unit 50. The acquisition of measured values by the CPU 3001 of the printer unit 30 may occur when a predetermined time passes after reception of the instruction of power measurement. Even if a job is finished, power during job execution may be acquired due to an influence of the job if the time after finishing the job is within a specified time (depending on the type of apparatus). The CPU 3001 of the printer unit 30 stores the acquisition times of the measured values in the storage apparatus (not illustrated) inside the printer unit 30.

After the measured values are acquired, the CPU 3001 of the printer unit 30 calculates power consumption by multiplying the voltage level and the current level (voltage level× current level) acquired in operation S108 described above. The CPU 3001 of the printer unit 30 also calculates an elapsed time from the time when a power measured value is acquired immediately before (last measured value acquisition time, here the time of operation S102 described above) to the execution time of operation S108 described above. Further, in operation S109, the CPU 3001 of the printer unit 30 calculates information (second power consumption information) indicating the power consumption amount during job processing by multiplying the above-calculated power (power consumption) and the time (elapsed time) (power×time).

Further, in operation S110, the CPU 3001 of the printer unit 30 notifies the CPU 1201 of information indicating the power consumption amount (set as a power consumption amount 1-2) calculated in operation S109 described above via the internal communication I/F 1208 of the controller unit 1200.

The power consumption amount 1-2 illustrated in FIG. 8 is the power consumption amount 1-2 of which the controller unit 1200 is notified from the printer unit 30 in operation S110 described above. In operation S111, the CPU 1201 of the controller unit 1200 retains information indicating the power consumption amount 1-2 in an applicable job history of the job history information table of the job history management unit 1212 as the power consumption amount (a job power consumption amount 609) consumed by the image forming apparatus 100 in the job.

The power consumption amount acquired in the first exemplary embodiment will be described in detail below with reference to FIG. 8. In FIG. 8, t0 is the time when power measurement is made immediately before. t1 is the execution time of S102 in the flow chart in FIG. 7. t2 is the execution time of S108 in the flow chart in FIG. 7.

Power consumption of the image forming apparatus increases, as indicated by a portion 901, after a job is started because the image forming apparatus enters a print start state such as the temperature of, for example, a fixing device being raised. After the image forming apparatus enters the print start state, as indicated by a portion 902, power consumption becomes constant. After a job is finished, the image forming apparatus enters a state called a standby state in which the image forming apparatus may start processing of the job immediately after the job is received, so that, as indicated by a portion 903, power consumption drops to become constant.

Because power consumption of an image forming apparatus changes as described above, the power consumption amount 1-2 acquired in the present exemplary embodiment becomes a value close to electric energy consumed during job processing. After the processing in FIG. 7, the job history collection unit 1291 acquires and retains the job history information table (FIG. 2) managed by the job history management unit 1212 according to instructions from the user via the operation unit 10 or at predetermined intervals. Further, the accumulated power consumption amount retaining unit 1292 reads the job power consumption amount 609 and the inter-job power consumption amount 610 from the job history information table retained in the job history collection unit 1291 and calculates a total power consumption amount (accumulated power consumption amount) from the above power consumption amounts to retain the total power consumption amount. Then, the interface unit 1293 reads the total power consumption amount retained by the accumulated power consumption amount retaining unit 1292 according to instructions from the user via the operation unit 10 or the like to display the total power consumption amount in the liquid crystal operation panel 11 of the operation unit 10.

Figure 9:
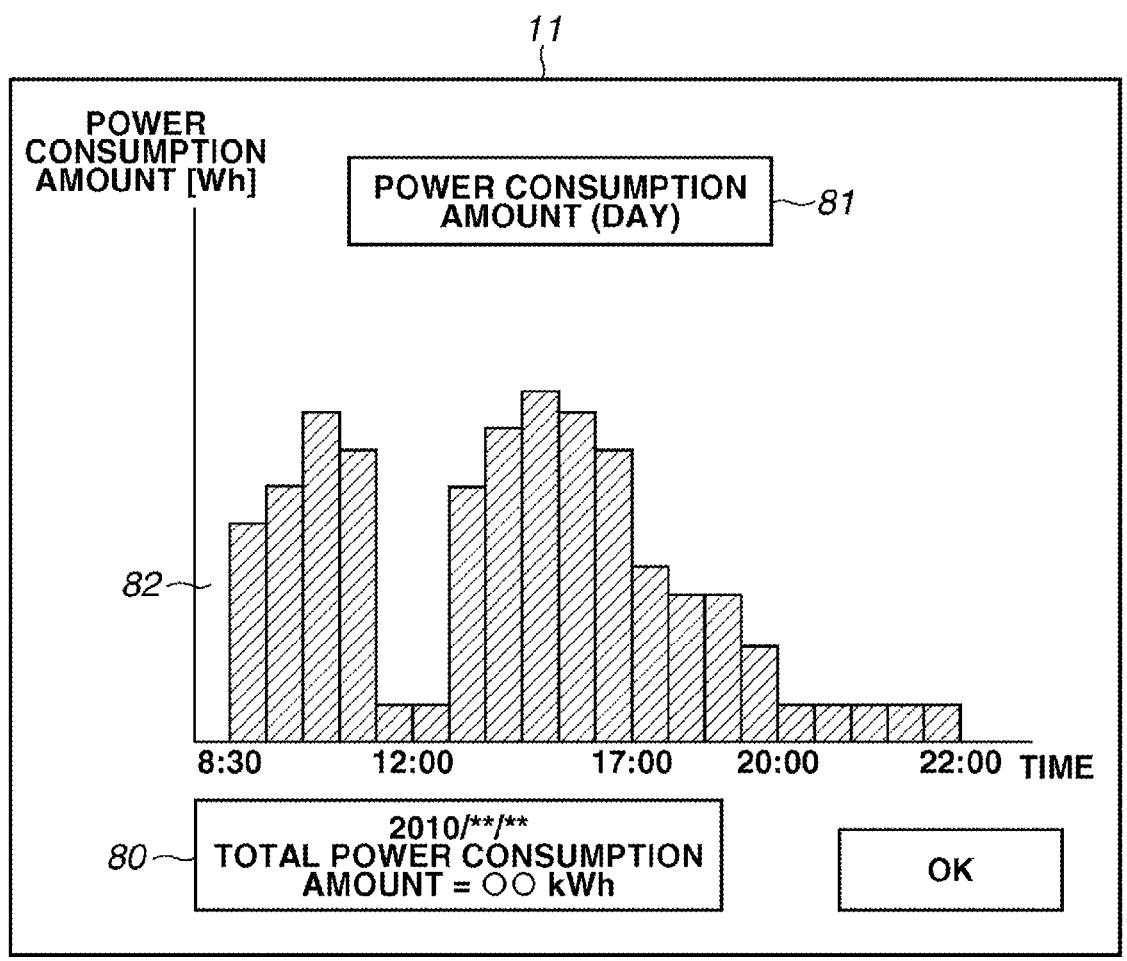
FIG. 9 is diagram illustrating a display example of the power consumption amount of the image forming apparatus according to the first exemplary embodiment.

The display/output of the power consumption amount of an image forming apparatus by the interface unit 1293 will be described below with reference to FIGS. 9 and 10. FIG. 9 is a diagram illustrating a display example of the power consumption amount of the image forming apparatus 100 according to the first exemplary embodiment. The display in FIG. 9 illustrates information of the power consumption amount displayed in the liquid crystal operation panel 11 by the operation unit 10 being operated by the user.

Reference numeral 81 denotes a title of display content and in this display example, information of the power consumption amount in one day is displayed as a graph and thus, the title is displayed as Power Consumption Amount (Day). Reference numeral 80 indicates the total power consumption amount in the displayed period.

In a power consumption amount graph 82, the power consumption amount in some period is displayed as a graph according to instructions from the user. In this case, the vertical axis denotes the power consumption amount per unit time and the horizontal axis denotes the time.

Figure 10:
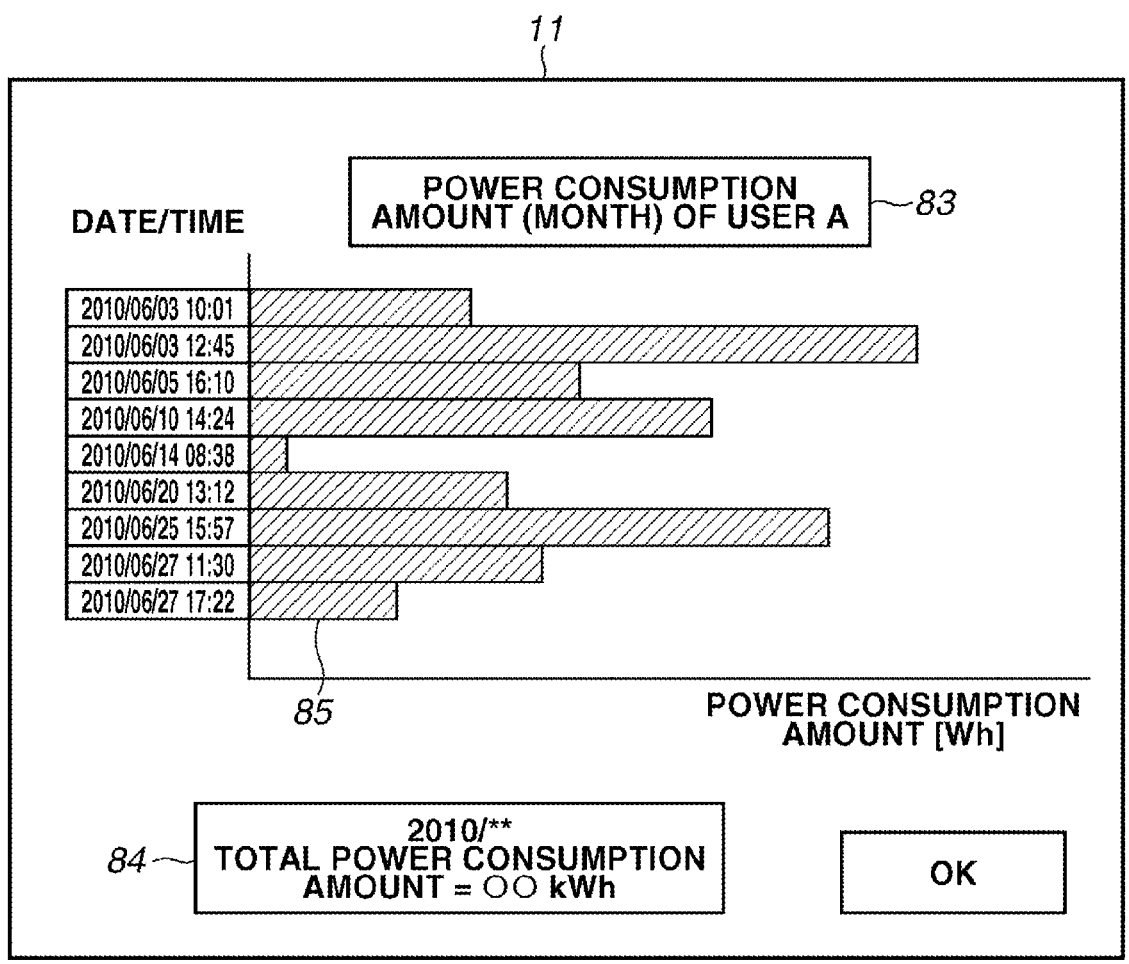
FIG. 10 is a diagram illustrating a display example of the power consumption amount of each job input by a user.

FIG. 10 is a diagram illustrating a display example of the power consumption amount of each job input by the user. The display in FIG. 10 is also made in the liquid crystal operation panel 11 by the operation unit 10 being operated by the user to issue instructions to display the power consumption amount for each job. In FIG. 10, reference numeral 83 denotes a title of display content and in this display example, information of the power consumption amount of user A in one month is displayed as a graph and thus, the title is displayed as Power Consumption Amount (Month) of user A. Reference numeral 84 indicates the total power consumption amount in the displayed period.

In a power consumption amount graph 85, the date time and the power consumption amount consumed by each job are displayed as a graph as information of jobs executed by the user A in the applicable month. In this case, the horizontal axis denotes the power consumption amount per unit time.

The display processing in FIGS. 9 and 10 is performed by the CPU 1201 after a display request (such as the specified period, specified user name, and specified integration unit (each hour, each job)) from the operation unit 10 by the user is conveyed to the CPU 1201 via the operation unit I/F 1206. More specifically, the display processing is realized by the power consumption amount management program 1290 being executed by the CPU 1201 (realized by functions of the job history collection unit 1291, the accumulated power consumption amount retaining unit 1292, and the interface unit 1293).

Information is displayed in the liquid crystal operation panel 11 of the operation unit 10 in the present exemplary embodiment, but may be displayed in a display unit of an external device such as the client PC 110 via the network unit 1210 after a request is received from the external device such as the client PC 110 in the LAN 3000.

In the present exemplary embodiment, as described above, the CPU 1201 of the controller unit 1200 performs control to make power measurement by the power measurement unit 50 through instructions to the CPU 3001 of the printer unit 30 when a job is started (when job processing is started) and the job is finished (job processing is finished). Then, the CPU 1201 of the controller unit 1200 performs control to calculate an inter-job power consumption amount of the image forming apparatus 100 by using (multiplying) power consumption measured when the job is started and an elapsed time from the measurement time immediately before when the job is started to the measurement time when the job is started. Further, the CPU 1201 of the controller unit 1200 performs control to calculate a job power consumption amount of the image forming apparatus 100 by using (multiplying) power consumption measured when the job is finished and an elapsed time from the measurement time when the job is started to the measurement time when the job is finished.

By calculating/measuring power consumption when job processing is started and finished with the above configuration, the power consumption amount may be calculated/measured for each job with high precision while the operation rate of the image forming apparatus being suppressed.

In a second exemplary embodiment of the present invention, an example in which the function of the power consumption amount management realized by an image forming apparatus in the first exemplary embodiment is realized by a power consumption calculation management server outside the image forming apparatus will be shown. By adopting the above configuration, information about power consumption amounts of a plurality of image forming apparatuses may be managed by the power consumption calculation management server in a centralized manner.

Figure 11:
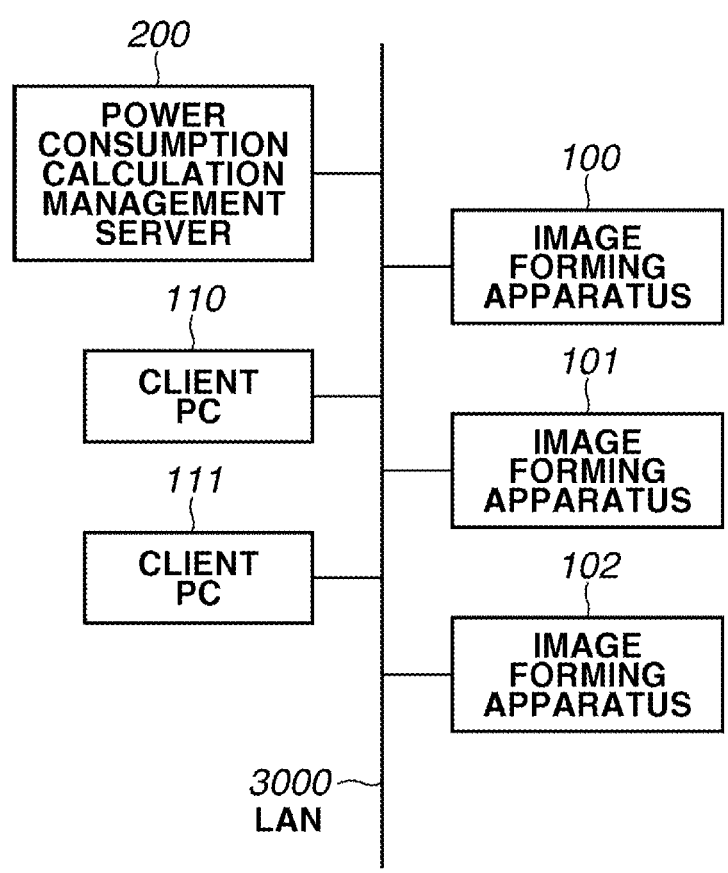
FIG. 11 is a configuration diagram of a network system that manages information about power consumption of each image forming apparatus according to a second exemplary embodiment of the present invention.

FIG. 11 is a configuration diagram of a network system that manages information about power consumption of each image forming apparatus according to the second exemplary embodiment.

As illustrated in FIG. 11, the present system includes the client PCs 110 and 111, the image forming apparatuses 100, 101, and 102, and a power consumption calculation management server 200. The client PCs 110 and 111, the image forming apparatuses 100, 101, and 102, and the power consumption calculation management server 200 are mutually communicably connected via the LAN 3000.

The power consumption calculation management server 200 is an information processing apparatus to manage information about power consumption of the image forming apparatuses 100, 101, and 102. The configuration of the image forming apparatuses 100, 101, and 102 in the present exemplary embodiment is almost the same as the configuration of the image forming apparatus shown in the first exemplary embodiment. However, as a difference from the first exemplary embodiment, the power consumption amount management program 1290 is not executed in the image forming apparatuses 100, 101, and 102. Each of the image forming apparatuses 100, 101, and 102 is assumed to perform the processing illustrated in FIG. 7 and store the job power consumption amount and inter-job power consumption amount in a job history table inside each of the job history management units 1212.

The hardware configuration of the power consumption calculation management server 200 is almost the same as the configuration of the client PC shown in the first exemplary embodiment. The CPU 1301 of the power consumption calculation management server 200 executes the power consumption amount management program 1290 described below.

The power consumption amount management program 1290 executed by the power consumption calculation management server 200 is the same as illustrated in FIG. 6.

The power consumption amount management program 1290 is stored in the HDD 1304 of the power consumption calculation management server 200 as a function to be realized by the power consumption calculation management server 200. The job history collection unit 1291 communicates with the image forming apparatuses 100, 101, and 102 via the interface unit 1293 according to instructions from the user via the operation unit 1306 and the LAN 3000 or at predetermined intervals to acquire and retain the job history information table managed by the job history management unit 1212 of each image forming apparatus. When the job history information table is collected from a plurality of image forming apparatuses, using an identifier of the image forming apparatus for the addition to the table as information may be considered.

The accumulated power consumption amount retaining unit 1292 reads the job power consumption amount and the inter-job power consumption amount from the job history information table retained in the job history collection unit 1291 and calculates a total power consumption amount (accumulated power consumption amount) from the above power consumption amounts and to retain the total power consumption amount. The function of the accumulated power consumption amount retaining unit 1292 is similar to the function thereof in the first exemplary embodiment.

The interface unit 1293 displays the total power consumption amount of each image forming apparatus retained by the accumulated power consumption amount retaining unit 1292 in a liquid crystal display of the operation unit 1306 according to instructions from the user via the operation unit 1306, the LAN 3000, and the like. The interface unit 1293 also performs control to output the total power consumption amount to the client PC 110 or other external devices connected to the LAN 3000 via the network unit 1307. The function of the interface unit 1293 is similar to the function thereof in the first exemplary embodiment.

Figure 12:
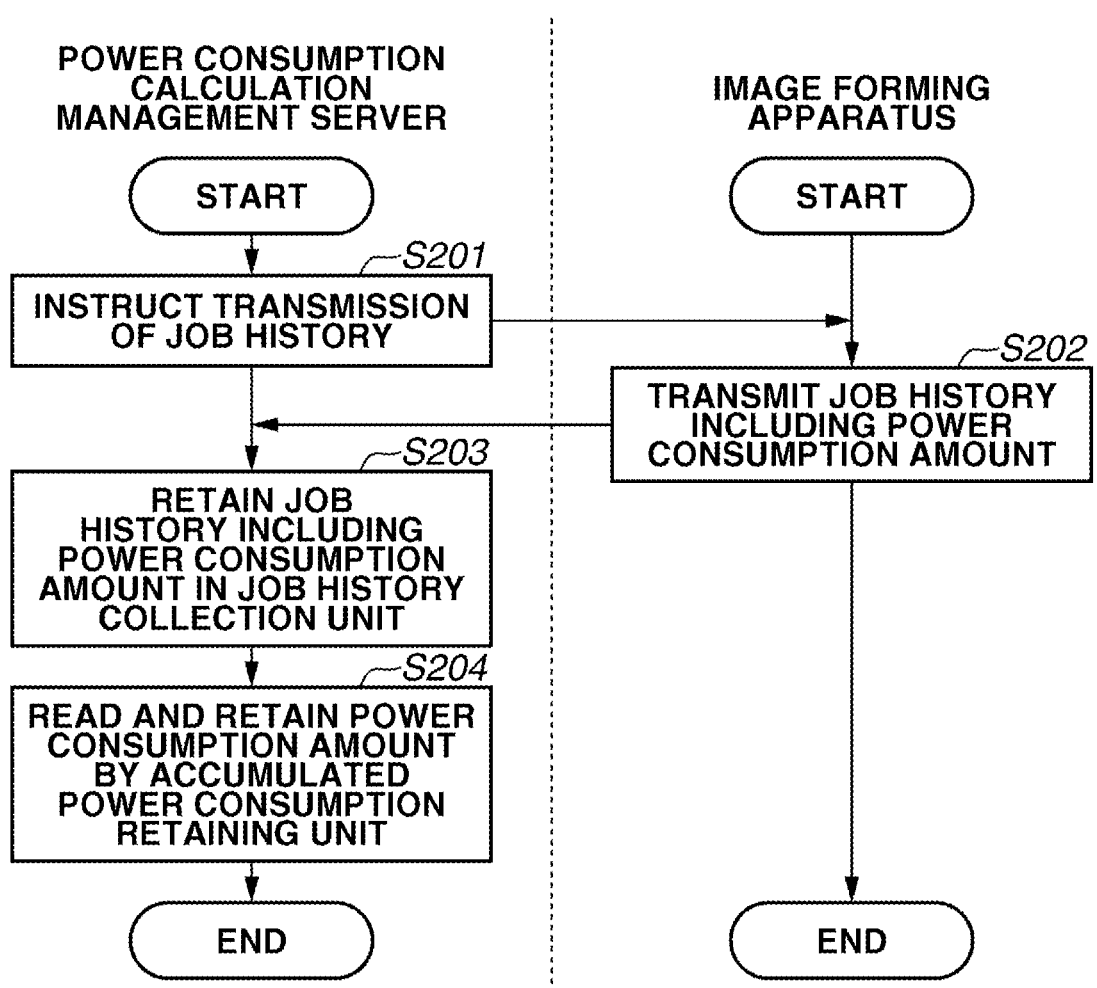
FIG. 12 is a flow chart illustrating an acquisition flow of power consumption amount information of a power consumption calculation management server according to the second exemplary embodiment.

FIG. 12 is a flow chart illustrating an acquisition flow of power consumption amount information of a power consumption calculation management server according to the present exemplary embodiment.

In operation S201, the CPU 1301 of the power consumption calculation management server 200 instructs the image forming apparatus 100 to send a job history via the network unit 1307. The image forming apparatus 100, which has received the instruction from the power consumption calculation management server 200 via the network unit 1210, performs processing in operation S202. In operation S202, the image forming apparatus 100 sends the job history information table (FIG. 2) retained by the job history management unit 1212 through the CPU 1201 to the power consumption calculation management server 200 via the network unit 1210. The acquisition method of the job power consumption amount and inter-job power consumption amount present in the job history information table is the same as the method described in the first exemplary embodiment with reference to FIGS. 7 and 8. The CPU 1201 of the image forming apparatus 100 may newly retain the sent job history information table in the job history management unit 1212 as a sent job history information table.

In operation S203, the CPU 1301 of the power consumption calculation management server 200, which has received the job history information table from the image forming apparatus 100 via the network unit 1307, retains the job history information table in the job history collection unit 1291. The processing of operation S201 and operation S203 corresponds to the function of the job history collection unit 1291.

Then, in operation S204, the CPU 1301 of the power consumption calculation management server 200 reads and retains the job power consumption amount and inter-job power consumption amount using the newly collected job history information table. The processing in operation S204 described above corresponds to the function of the accumulated power consumption amount retaining unit 1292. The accumulated power consumption amount retaining unit 1292 performs integration processing in various units (the user unit, time unit, job unit, or a combination thereof) if necessary.

The job power consumption amount and inter-job power consumption amount of each image forming apparatus may be made calculable and measurable by the processing of the above flow chart (FIG. 12) being performed by the power consumption calculation management server 200 for each image forming apparatus.

By calculating/measuring the power consumption amount when job processing is started and finished as described above, power consumption amounts of a plurality of image forming apparatuses may be managed in a centralized manner by the power consumption calculation management server 200 while the operation rate of the image forming apparatuses is suppressed.

In the first and second exemplary embodiments, an example of reducing the operation rate of an image forming apparatus by acquiring the power value from the power measurement unit when a job is started and finished and calculating the power consumption amount has been described. In a third exemplary embodiment of the present invention, an example in which the power measurement unit or a portion (printer unit 30) that controls the power measurement unit acquires the power value and calculates the power consumption amount at regular intervals and a portion (controller unit 1200) that manages power acquires the power consumption amount when a job is started and finished will be shown. By reducing the frequency of acquiring the power consumption amount, the operation rate of the CPU 1201 of the controller unit 1200 may be reduced. Differences will be described in detail in comparison with the first exemplary embodiment.

The hardware configuration of an image forming apparatus according to the present exemplary embodiment is the same as the configuration in the first exemplary embodiment. In the present exemplary embodiment, however, the printer unit 30 acquires the power measured value from the power measurement unit 50 and calculates the power consumption amount at regular intervals to store the power consumption amount in a storage apparatus (not illustrated) inside the printer unit 30. If there is no instruction to send from the CPU 1201 of the controller unit 1200, the CPU 3001 of the printer unit 30 continues to acquire the power measured value and to update the power consumption amount. The acquisition of the power measured value and the calculation of the power consumption amount are processing similar to the processing in operation S102 and operation S103 in FIG. 7. On the other hand, the CPU 1201 of the controller unit 1200 instructs the printer unit 30 to send the power consumption amount retained by the printer unit 30 via the internal communication I/F 1208. Further, the job history management unit 1212 of the controller unit 1200 generates and retains a job history information table by using the power consumption amount sent from the printer unit 30.

Next, print job execution by an image forming apparatus and an update flow of power consumption amount information according to the present exemplary embodiment will be described.

Figure 13:
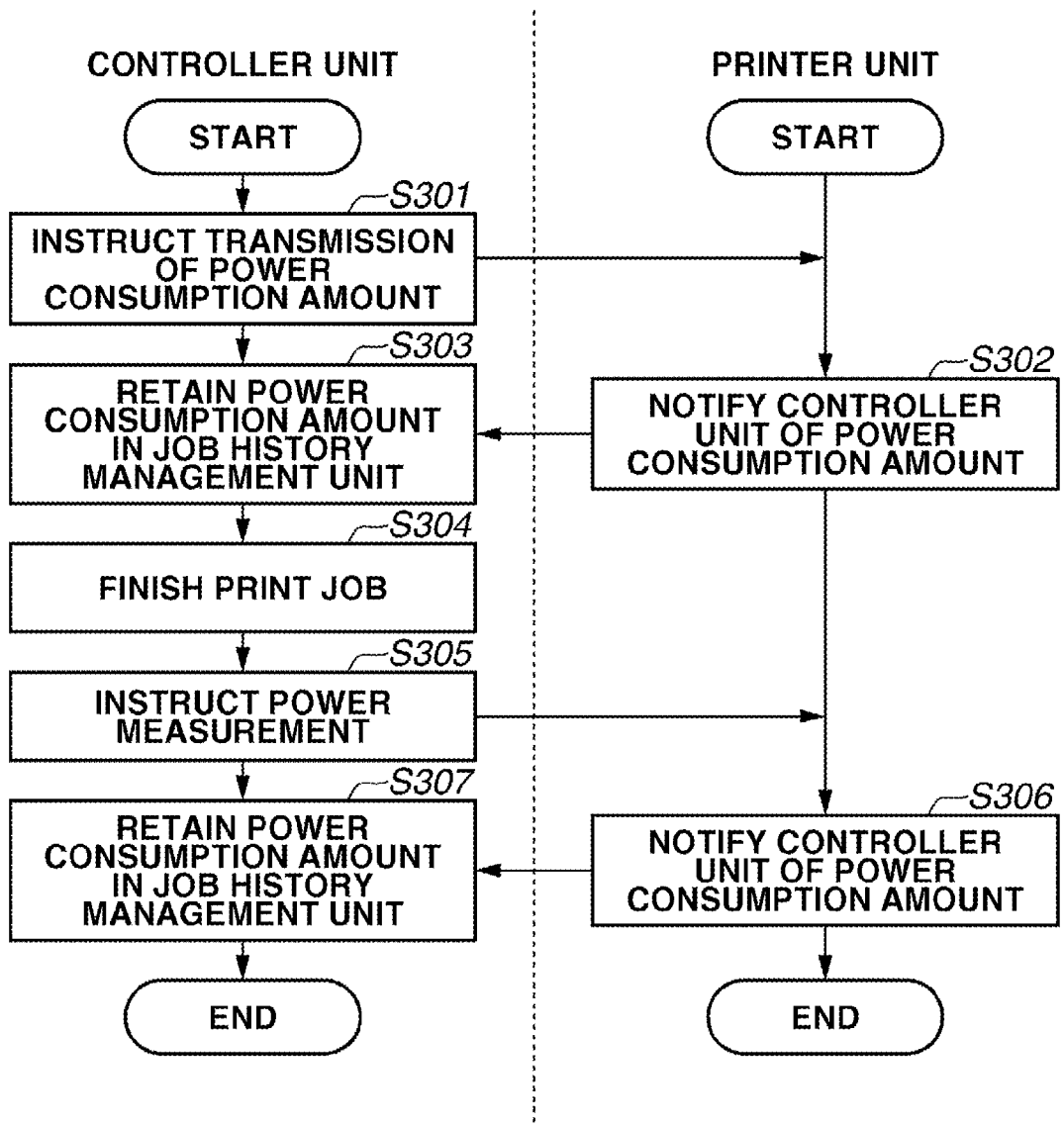
FIG. 13 is a flow chart illustrating timing of print job execution and power consumption amount acquisition according to a third exemplary embodiment of the present invention.

The flow of print job execution is the same as in the first exemplary embodiment. FIG. 13 is a flow chart illustrating timing of print job execution and power consumption amount acquisition according to the third exemplary embodiment. Processing on the side of the controller unit 1200 in FIG. 13 is realized by a program computer-readably recorded in the HDD 1204 being read and executed by the CPU 1201 of the controller unit 1200. Processing on the side of the printer unit 30 is realized by a program computer-readably recorded in a ROM (not illustrated) or the like being read and executed by the CPU 3001 of the printer unit 30.

First, when a print job is received, in operation S301, the CPU 1201 of the controller unit 1200 starts the print job and notifies the printer unit 30 of the start of the job via the internal communication I/F 1208 and at the same time, instructs the printer unit 30 to send the power consumption amount. The received job is managed by the job history management unit 1212 and job information of the job is retained in the job history information table (FIG. 2).

In operation S302, the CPU 3001 of the printer unit 30, which has received the instruction to send the power consumption amount, notifies the CPU 1201 of information indicating the power consumption amount (set as a power consumption amount 3-1) retained in the storage apparatus (not illustrated) of the printer unit 30 via the internal communication I/F 1208 of the controller unit 1200. The power consumption amount 3-1 notified here is, as described above, the power consumption amount calculated by reading the power value from the power measurement unit 50 at regular intervals and retained in the storage apparatus (not illustrated) of the printer unit 30 by the CPU 3001.

Figure 14:
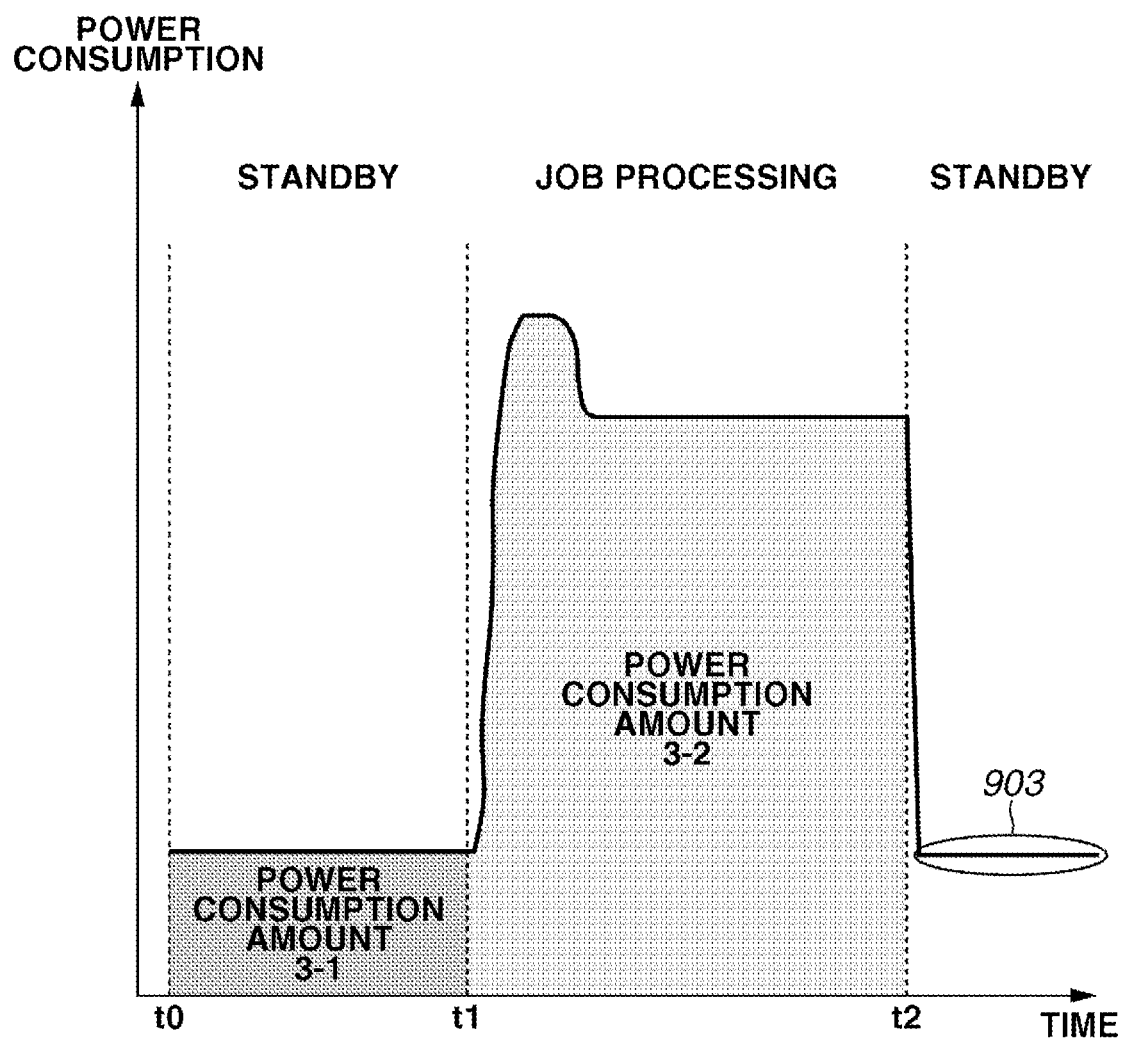
FIG. 14 is a schematic diagram illustrating the relationship between the power consumption of the image forming apparatus and the elapsed time between the start and the end of a job.

FIG. 14 is a schematic diagram illustrating the relationship between the power consumption of the image forming apparatus and the elapsed time between the start and the end of a job. The power consumption amount 3-1 illustrated in FIG. 14 is the power consumption amount 3-1 of which the controller unit 1200 is notified from the printer unit 30 in operation S302 described above. In operation S303, the CPU 1201 of the controller unit 1200 retains the power consumption amount 3-1 in the applicable job history of the job history information table of the job history management unit 1212 as the power consumption amount (inter-job power consumption amount 610) consumed by the image forming apparatus between jobs.

Then, in operation S304, if the CPU 1201 of the controller unit 1200 determines that the print job is finished, then in operation S305, the CPU 1201 of the controller unit 1200 notifies the printer unit 30 of the end of the job via the internal communication I/F 1208 and at the same time, instructs the printer unit 30 to send the power consumption amount.

In operation S306, the CPU 3001 of the printer unit 30, which has received the instruction to make power measurement, notifies the CPU 1201 of information indicating the power consumption amount (set as a power consumption amount 3-2) retained in the storage apparatus (not illustrated) of the printer unit 30 via the internal communication I/F 1208. The power consumption amount 3-2 notified here is also, as described above, the power consumption amount calculated by reading the power value from the power measurement unit 50 at regular intervals and retained in the storage apparatus (not illustrated) of the printer unit 30 by the CPU 3001.

The power consumption amount 3-2 illustrated in FIG. 14 is the power consumption amount 3-2 of which the controller unit 1200 is notified from the printer unit 30 in operation S306 described above. Next, in operation S307, the CPU 1201 of the controller unit 1200 retains the power consumption amount 3-2 in the applicable job history of the job history information table of the job history management unit 1212 as the power consumption amount (job power consumption amount 609) consumed by the image forming apparatus 100 in the job.

The power consumption amount acquired in the third exemplary embodiment will be described in detail with reference to FIG. 14. In FIG. 14, t0 is the time when power measurement is made immediately before, that is, the time when the job immediately before is finished. t1 is the execution time of S302 in the flow chart in FIG. 13. t2 is the time of S304 in the flowchart in FIG. 13. In the present exemplary embodiment, the printer unit 30 makes power measurement and calculates the power consumption amount at regular intervals also during the job and thus, the power consumption amount 3-2 is a value extremely close to the power amount actually consumed by the image forming apparatus 100 for job processing.

After the processing in FIG. 13, also in the third exemplary embodiment, like in the first exemplary embodiment, the job history collection unit 1291 collects the job history according to instructions from the user via the operation unit 10 or the like or at predetermined intervals or the like. Thereafter, the accumulated power consumption amount retaining unit 1292 retains the accumulated power consumption amount. Then, the interface unit 1293 displays/outputs the total power consumption amount according to instructions from the user.

In the present exemplary embodiment, as described above, the CPU 3001 of the printer unit 30 makes power measurement through the power measurement unit 50 at regular intervals and calculates and integrates the power consumption amount of the image forming apparatus 100 based on the power measurement, and stores the power consumption amount in the storage apparatus (not illustrated) inside the printer unit 30. Then, the CPU 1201 of the controller unit 1200 acquires the power consumption amount from the printer unit 30 when a job is started and finished. Further, the CPU 1201 of the controller unit 1200 performs control so that the power consumption amount acquired when the job is started is set as an inter-job power consumption amount and the power consumption amount acquired when the job is finished is set as a job power consumption amount.

The above configuration enables the CPU 3001 of the printer unit 30 to calculate the power consumption amount at regular intervals and the CPU 1201 of the controller unit 1200 to instruct the printer unit 30 to send the power consumption amount only when job processing is started and finished. Accordingly, power consumption for each job may be calculated/measured with high precision while the operation rate of the CPU 1201 is suppressed.

A fourth exemplary embodiment of the present invention is directed to a method of acquiring the power consumption amount of each job when a plurality of jobs that may operate in parallel such as a print job and a scan job is executed. Differences will be described in detail in comparison with the first exemplary embodiment.

Execution of parallel operations of a print job and a scan job of an image forming apparatus and an update flow of power consumption amount information according to the present exemplary embodiment will be described.

The flow of print job execution is the same as in the first exemplary embodiment. The flow of execution of a scan job will be described below. The image forming apparatus 100 performs scan processing as described below based on instructions of the scan job from the operation unit 10. When a scan job is received, the CPU 1201 of the controller unit 1200 notifies the scanner unit 20 of the start of the job via the internal communication I/F 1208. Following the notification of the start of the job, the CPU 2001 of the scanner unit 20 performs control to make the scanner unit 20 ready for reading. Then, reading by the scanner unit 20 is started and the RAM 1202 is caused to store the read image data.

Then, the image data is supplied to the image compression unit 1240 and then accumulated in the HDD 1204 after compression processing is performed thereon. Next, the image data (compressed bitmap data) accumulated in the HDD 1204 is sent to a device specified as the destination address by the CPU 1201 of the controller unit 1200 via the network unit 1210. The destination address is set by the user via the operation unit 10. Needless to say, the HDD 1204 of the image forming apparatus 100 may be selected as the destination address.

After the sending processing is completed, the CPU 1201 of the controller unit 1200 notifies the scanner unit 20 of the end of the job via the internal communication I/F 1208. Following the notification of the end of the job, the CPU 2001 of the scanner unit 20 performs control to make the scanner unit 20 ready for finishing printing.

Figure 15:
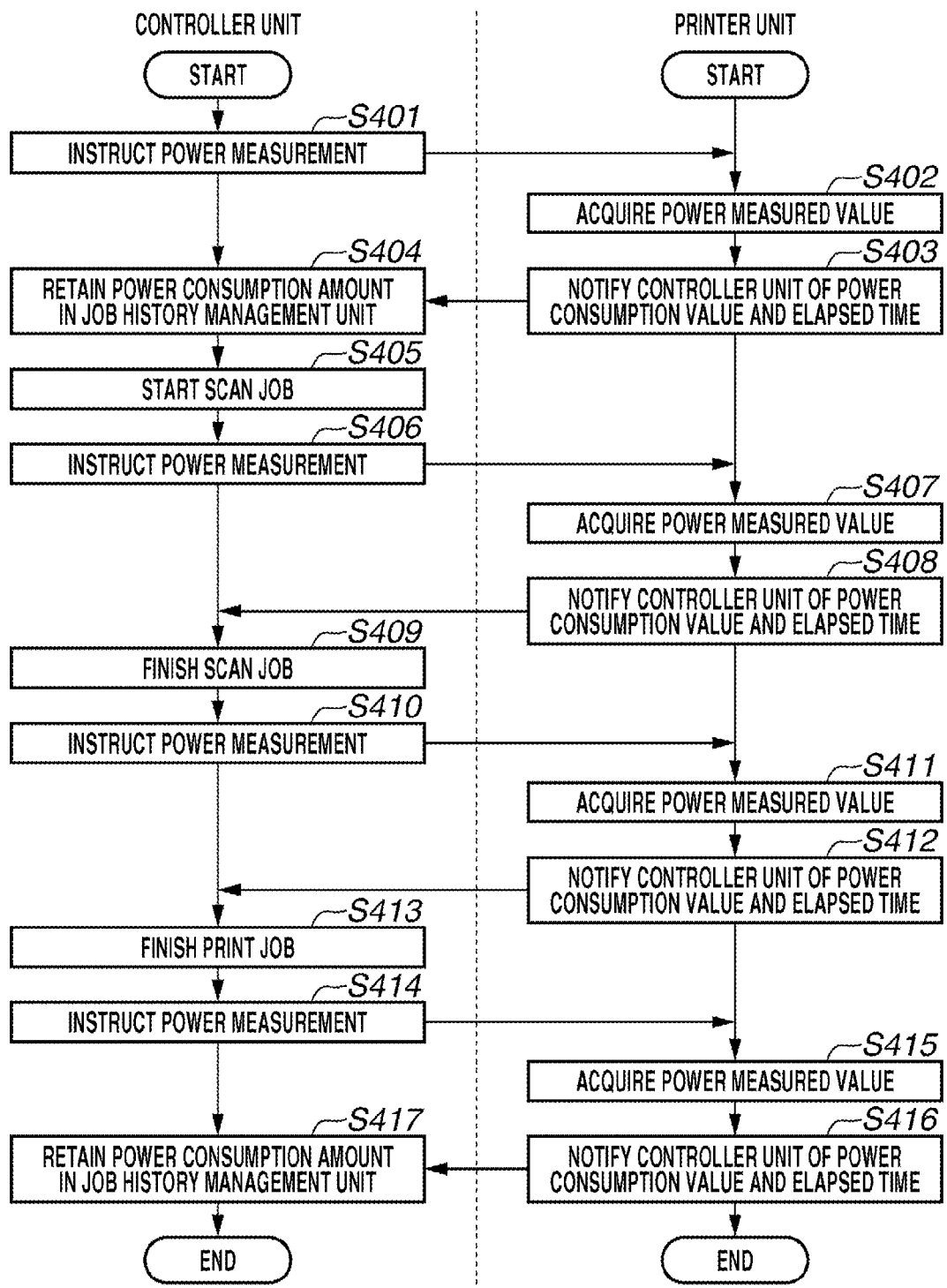
FIG. 15 is a flow chart illustrating the timing of print job/scan job execution and power value acquisition according to a fourth exemplary embodiment of the present invention.

FIG. 15 is a flow chart illustrating the timing of print job/scan job execution and power value acquisition according to the fourth exemplary embodiment. Processing on the side of the controller unit 1200 in FIG. 15 is realized by a program computer-readably recorded in the HDD 1204 being read and executed by the CPU 1201 of the controller unit 1200. Processing on the side of the printer unit 30 is realized by a program computer-readably recorded in a ROM (not illustrated) or the like being read and executed by the CPU 3001 of the printer unit 30.

In the present exemplary embodiment, in contrast to the first exemplary embodiment, the flow of a case when a power consumption value and an elapsed time are notified from the printer unit 30 and the power consumption amount is calculated by the CPU 1201 of the controller unit 1200 will be described. Here, an example in which a scan job is executed while a print job is being processed will be shown.

First, when a print job is received, in operation S401, the CPU 1201 of the controller unit 1200 starts the print job and notifies the printer unit 30 of the start of the job via the internal communication I/F 1208 and at the same time, instructs the printer unit 30 to make power measurement. The received job is managed by the job history management unit 1212 and job information of the job is retained in the job history information table (FIG. 2).

In operation S402, the CPU 3001 of the printer unit 30, which has received the instruction of power measurement, acquires measured values of the power measurement unit 50. The acquisition of measured values by the printer unit 30 may occur when a predetermined time passes after reception of the instruction of power measurement. The CPU 3001 of the printer unit 30 stores the acquisition times of the measured values in a storage apparatus (not illustrated) inside the printer unit 30.

After the measured values are acquired, the CPU 3001 of the printer unit 30 calculates power consumption 4-1 by multiplying the voltage level and the current level (voltage level× current level) acquired in operation S402 described above. The CPU 3001 of the printer unit 30 also calculates an elapsed time 4-1 from the time when a power measured value is acquired immediately before (last measured value acquisition time) to the execution time of operation S402 described above. Further, in operation S403, the CPU 3001 of the printer unit 30 notifies the CPU 1201 of the power consumption value 4-1 together with the elapsed time 4-1 via the internal communication I/F 1208 of the controller unit 1200.

Figure 16:
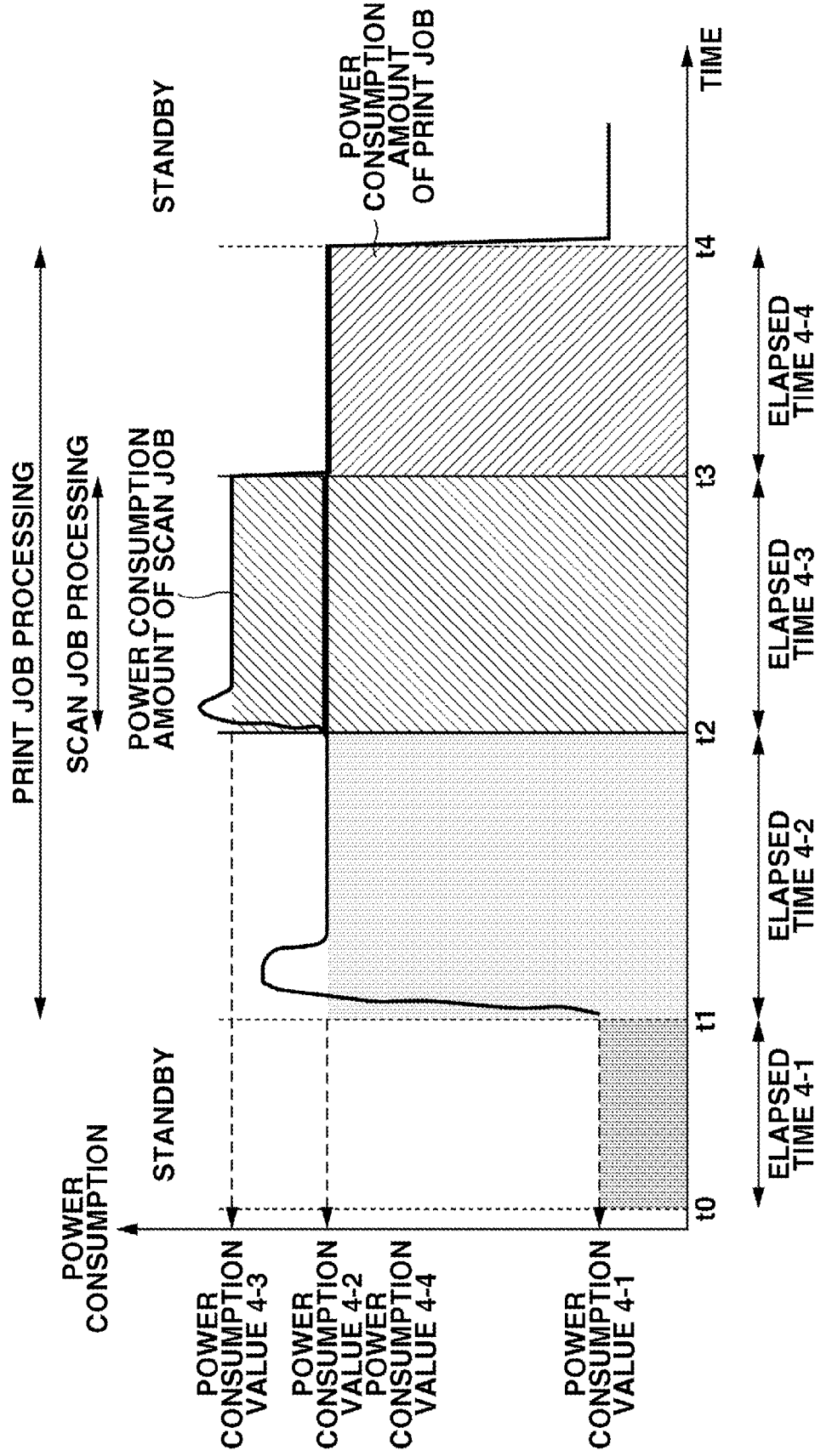

FIG. 16 is a schematic diagram illustrating the relationship between the power consumption of the image forming apparatus and the elapsed time between the start and the end of a job when a subsequent job is finished before a preceding job is finished. The power consumption value 4-1 and the elapsed time 4-1 illustrated in FIG. 16 are the power consumption value 4-1 and the elapsed time 4-1 of which the controller unit 1200 is notified from the printer unit 30 in operation S403 described above.

Referring back to the flow chart of FIG. 15, the CPU 1201 of the controller unit 1200 calculates the power consumption amount, by multiplying the power (a power consumption value 4-1) and the time (an elapsed time 4-1) (power×time). In operation S404, the CPU 1201 of the controller unit 1200 retains the power consumption amount calculated as described above in the applicable job history of the job history information table of the job history management unit 1212 as the power consumption amount (an inter-job power consumption amount 610) consumed by the image forming apparatus between jobs.

Then, when a scan job is received, in operation S405, the CPU 1201 of the controller unit 1200 starts the scan job and, in operation S406, notifies the scanner unit 20 of the start of the job via the internal communication I/F 1208 and at the same time, instructs the printer unit 30 to make power measurement. The received job is managed by the job history management unit 1212 and job information of the job is retained in the job history information table (FIG. 2).

In operation S407, the CPU 3001 of the printer unit 30, which has received the instruction of power measurement, acquires measured values of the power measurement unit 50. The acquisition of measured values by the printer unit 30 may occur when a predetermined time passes after reception of the instruction of power measurement. The CPU 3001 of the printer unit 30 stores the acquisition times of the measured values in a storage apparatus (not illustrated) inside the printer unit 30.

After the measured values are acquired, the CPU 3001 of the printer unit 30 calculates power consumption 4-2 by multiplying the voltage level and the current level (voltage level× current level) acquired in operation S407 described above. The CPU 3001 of the printer unit 30 also calculates an elapsed time 4-2 from the time when a power measured value is acquired immediately before (a last measured value acquisition time, here the time of operation S402) to the execution time of operation S407 described above. Further, in operation S408, the CPU 3001 of the printer unit 30 notifies the CPU 1201 of the power consumption value 4-2 together with the elapsed time 4-2 via the internal communication I/F 1208 of the controller unit 1200.

The power consumption value 4-2 and the elapsed time 4-2 illustrated in FIG. 16 are the power consumption value 4-2 and the elapsed time 4-2 of which the controller unit 1200 is notified from the printer unit 30 in operation S408 described above.

Then, in operation S409, if the CPU 1201 of the controller unit 1200 determines that the scan job is finished, then in operation S410, the CPU 1201 of the controller unit 1200 notifies the scanner unit 20 of the end of the job via the internal communication I/F 1208 and at the same time, instructs the printer unit 30 to make power measurement.

In operation S411, the CPU 3001 of the printer unit 30, which has received the instruction of power measurement, acquires measured values of the power measurement unit 50. The acquisition of measured values by the printer unit 30 may occur when a predetermined time passes after reception of the instruction of power measurement. The CPU 3001 of the printer unit 30 stores the acquisition times of the measured values in a storage apparatus (not illustrated) inside the printer unit 30.

After the measured values are acquired, the CPU 3001 of the printer unit 30 calculates power consumption 4-3 by multiplying the voltage level and the current level (voltage level× current level) acquired in operation S411 described above. The CPU 3001 of the printer unit 30 also calculates an elapsed time 4-3 from the time when a power measured value is acquired immediately before (a last measured value acquisition time, here the time of operation S407) to the execution time of operation S411 described above. Further, in operation S412, the CPU 3001 of the printer unit 30 notifies the CPU 1201 of the power consumption value 4-3 together with the elapsed time 4-3 via the internal communication I/F 1208 of the controller unit 1200.

The power consumption value 4-3 and the elapsed time 4-3 illustrated in FIG. 16 are the power consumption value 4-3 and the elapsed time 4-3 of which the controller unit 1200 is notified from the printer unit 30 in operation S412 described above.

Then, in operation S413, if the CPU 1201 of the controller unit 1200 determines that the print job is finished, then in operation S414, the CPU 1201 of the controller unit 1200 notifies the printer unit 30 of the end of the job via the internal communication I/F 1208 and at the same time, instructs the printer unit 30 to make power measurement.

In operation S415, the CPU 3001 of the printer unit 30, which has received the instruction of power measurement, acquires measured values of the power measurement unit 50. The acquisition of measured values by the printer unit 30 may occur when a predetermined time passes after reception of the instruction of power measurement. The CPU 3001 of the printer unit 30 stores the acquisition times of the measured values in a storage apparatus (not illustrated) inside the printer unit 30.

After the measured values are acquired, the CPU 3001 of the printer unit 30 calculates power consumption 4-4 by multiplying the voltage level and the current level (voltage level× current level) acquired in operation S415 described above. The CPU 3001 of the printer unit 30 also calculates an elapsed time 4-4 from the time when a power measured value is acquired immediately before (a last measured value acquisition time, here the time of operation S411) to the execution time of operation S415 described above. Further, in operation S416, the CPU 3001 of the printer unit 30 notifies the CPU 1201 of the power consumption value 4-4 together with the elapsed time 4-4 via the internal communication I/F 1208 of the controller unit 1200.

The power consumption value 4-4 and the elapsed time 4-4 illustrated in FIG. 16 are the power consumption value 4-4 and the elapsed time 4-4 of which the controller unit 1200 is notified from the printer unit 30 in operation S416 described above.

In operation S417, the CPU 1201 of the controller unit 1200 calculates job power consumption amounts of the scan job and the print job from the power consumption value 4-2 and the elapsed time 4-2, the power consumption value 4-3 and the elapsed time 4-3, and the power consumption value 4-4 and the elapsed time 4-4. That is, each job power consumption amount is calculated by using power consumption measured when jobs is started, power consumption acquired when each of the jobs is finished, and an elapsed time between each of the measurement times.

More specifically, job power consumption amounts of a scan job and a print job are calculated by using formulas shown below:

Power consumption amount of print job=(power consumption value 4-2)×(elapsed time 4-2+elapsed time 4-3)+(power consumption amount 4-4)×(elapsed time 4-4)

Power consumption amount of scan job=(power consumption value 4-3−power consumption value 4-2)×(elapsed time 4-3)

That is, the power consumption amount of a preceding job is calculated by adding [a value obtained by multiplying (a power consumption value measured when a subsequent job is started) and (an elapsed time from the measurement time when the preceding job is started to the measurement time when the subsequent job is finished)] and [a value obtained by multiplying (a power consumption amount measured when the preceding job is finished) and (an elapsed time from the measurement time when the subsequent job is finished to the measurement time when the preceding job is finished)].

The power consumption amount of the subsequent job is calculated by multiplying (a value obtained by subtracting the power consumption value measured when the subsequent job is started from the power consumption value measured when the subsequent job is finished) and (an elapsed time from the measurement time when the subsequent job is started to the measurement time when the subsequent job is finished).

By using the above formulas, each of the power consumption amounts of a plurality of jobs executed in parallel and of which processing of the subsequent job is finished before processing of the preceding job is finished is calculated.

In operation S417, the power consumption amount of the scan job and the power consumption amount of the print job calculated by using the above formulas are retained in the applicable job history of the job history information table of the job history management unit 1212 as the respective power consumption amount (the job power consumption amount 609) consumed by the image forming apparatus 100 in the scan job and the print job. The inter-job power consumption amount 610 of the scan job started during processing of the print job, which is the preceding job, is stored in the job history information table as "0".

The power consumption values and the elapsed times acquired in the fourth exemplary embodiment will be described in detail with reference to FIG. 16. In FIG. 16, t0 is the time when power measurement is made immediately before. t1 is the execution time of S402 in the flow chart in FIG. 15. t2 is the execution time of S407 in the flow chart in FIG. 15. Similarly, t3 and t4 are execution times of operation S411 and operation S415 in the flow chart in FIG. 15 respectively.

After the print job is started, the power consumption value increases because the image forming apparatus is caused to enter a print start state such as the temperature of, for example, a fixing device being raised, but after the image forming apparatus enters the print start state, the power consumption value takes a constant value. When the scan job is started during processing of the print job, the power consumption value increases because the image forming apparatus is caused to enter a scan start state such as, for example, an illumination lamp being lit. After the image forming apparatus enters the scan start state, the power consumption value takes a constant value. By using this property, the power consumption amount of a scan job and the power consumption amount of a print job may be calculated/measured with high precision using formulas as shown above.

After the processing in FIG. 15, also in the fourth exemplary embodiment, like in the first exemplary embodiment, the job history collection unit 1291 collects the job history according to instructions from the user via the operation unit 10 or the like or at predetermined intervals or the like. Thereafter, the accumulated power consumption amount retaining unit 1292 retains the accumulated power consumption amount. Then, the interface unit 1293 displays/outputs the total power consumption amount according to instructions from the user.

By using the above method, even when a plurality of jobs operates in parallel, the power consumption amount of each job may be calculated/measured with high precision while the operation rate of the controller of the image forming apparatus being suppressed.

In the fourth exemplary embodiment, a case when the subsequent job (the scan job in the above example) is finished before the preceding job (the print job in the above example) is finished has been described. However, a case when the subsequent job (the scan job) is finished after the preceding job (the print job) is finished may also be considered. The power consumption calculation method in this case will be described below.

Figure 17:
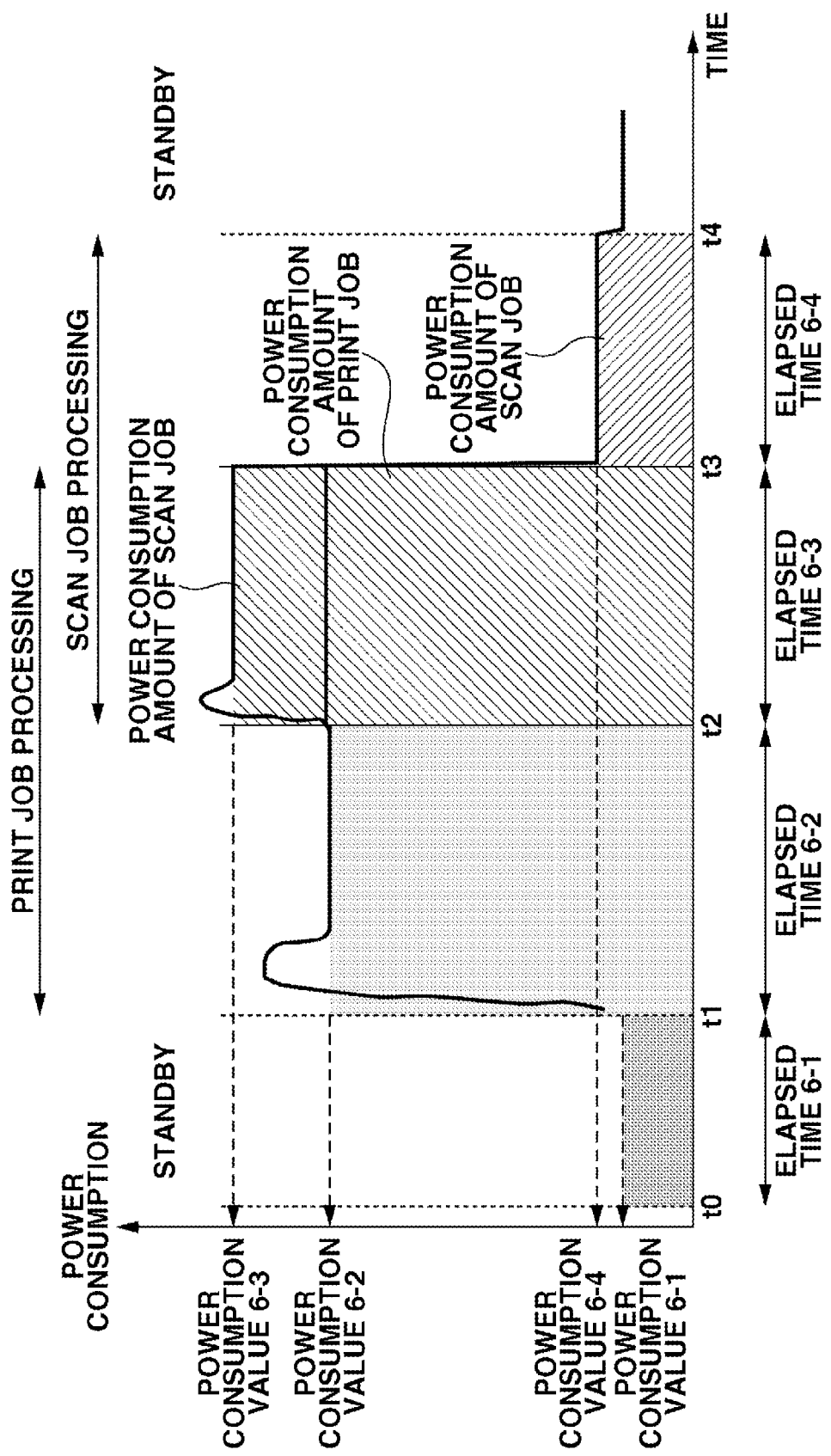
FIG. 17 is a schematic diagram illustrating the relationship between the power consumption of the image forming apparatus and the elapsed time between the start and the end of a job when the subsequent job is finished after the preceding job is finished.

FIG. 17 is a schematic diagram illustrating the relationship between the power consumption of the image forming apparatus and the elapsed time between the start and the end of a job when the subsequent job is finished after the preceding job is finished. In FIG. 17, t0 is the time when power measurement is made immediately before. t1 is the power measurement time when the preceding job (a print job here) is started. t2 is the power measurement time when the subsequent job (a scan job here) is started. t3 is the power measurement time when the preceding job is finished. t4 is the power measurement time when the subsequent job is finished.

After the print job (preceding job) is started, the power consumption value increases because the image forming apparatus is caused to enter a print start state such as the temperature of, for example, a fixing device being raised, but after the image forming apparatus enters the print start state, the power consumption value takes a constant value. When the scan job (subsequent job) is started during processing of the print job, the power consumption value increases because the image forming apparatus is caused to enter a scan start state such as, for example, an illumination lamp being lit. After the image forming apparatus enters the scan start state, the power consumption value takes a constant value. By using this property, the power consumption amount of a scan job and the power consumption amount of a print job may be calculated/measured with high precision using formulas as shown below.

Power consumption amount of print job=(power consumption value 6-2)×(elapsed time 6-2+elapsed time 6-3), power consumption amount of scan job=(power consumption value 6-3−power consumption value 6-2)×(elapsed time 6-3)+(power consumption amount 6-4)×(elapsed time 6-4)

That is, the power consumption amount of the preceding job is calculated by multiplying (a power consumption value measured when the subsequent job is started) and (an elapsed time from the measurement time when the preceding job is started to the measurement time when the preceding job is finished).

The power consumption amount of the subsequent job is calculated by adding [a value obtained by multiplying (a value obtained by subtracting the power consumption value measured when the subsequent job is started from the power consumption value measured when the preceding job is finished) and (an elapsed time from the measurement time when the subsequent job is started to the measurement time when the preceding job is finished)] and [a value obtained by multiplying (a power consumption value measured when the subsequent job is finished) and (an elapsed time from the measurement time when the preceding job is finished to the measurement time when the subsequent job is finished)].

By using the above formulas, each of the power consumption amounts of a plurality of jobs executed in parallel and of which processing of the subsequent job is finished after processing of the preceding job is finished is calculated.

A fifth exemplary embodiment of the present invention is directed to a method of acquiring the power consumption amount of each job when a job that may not operate in parallel interrupts during job processing (for example, a copy job interrupts during execution of a print job). Differences will be described in detail in comparison with the first exemplary embodiment.

An operation in which a copy job interrupts to perform processing thereof during processing of a print job in an image forming apparatus according to the present exemplary embodiment and an update flow of power consumption amount information according to the present exemplary embodiment will be described.

The flow of print job execution is the same as in the first exemplary embodiment. The flow of execution of a copy job will be described below.

The image forming apparatus 100 performs scan processing as described below based on instructions of the copy job from the operation unit 10. When the copy job is received, the CPU 1201 of the controller unit 1200 notifies the scanner unit 20 and the printer unit 30 of the start of the copy job via the internal communication I/F 1208. Following the notification of the start of the job, the CPU 2001 of the scanner unit 20 performs control to make the scanner unit 20 ready for reading. Then, reading by the scanner unit 20 is started and the RAM 1202 is caused to store the read image data.

Then, the image data is supplied to the image compression unit 1240 and then accumulated in the HDD 1204 after compression processing being performed thereon. Next, the image data (compressed bitmap data) accumulated in the HDD 1204 is supplied to the image compression unit 1240 via the image bus I/F 1205. The image compression unit 1240 decompresses the supplied image data (compressed bitmap data) and the printer image processing unit 1270 makes printer corrections, resolution conversion, and the like and the image rotation unit 1230 performs rotation processing on the image data if necessary. Subsequently, image data on which various kinds of processing have been performed is sent to the printer unit 30 via the device I/F 1220 as print data and print processing thereof is performed on paper by the printer unit 30.

Figure 18:
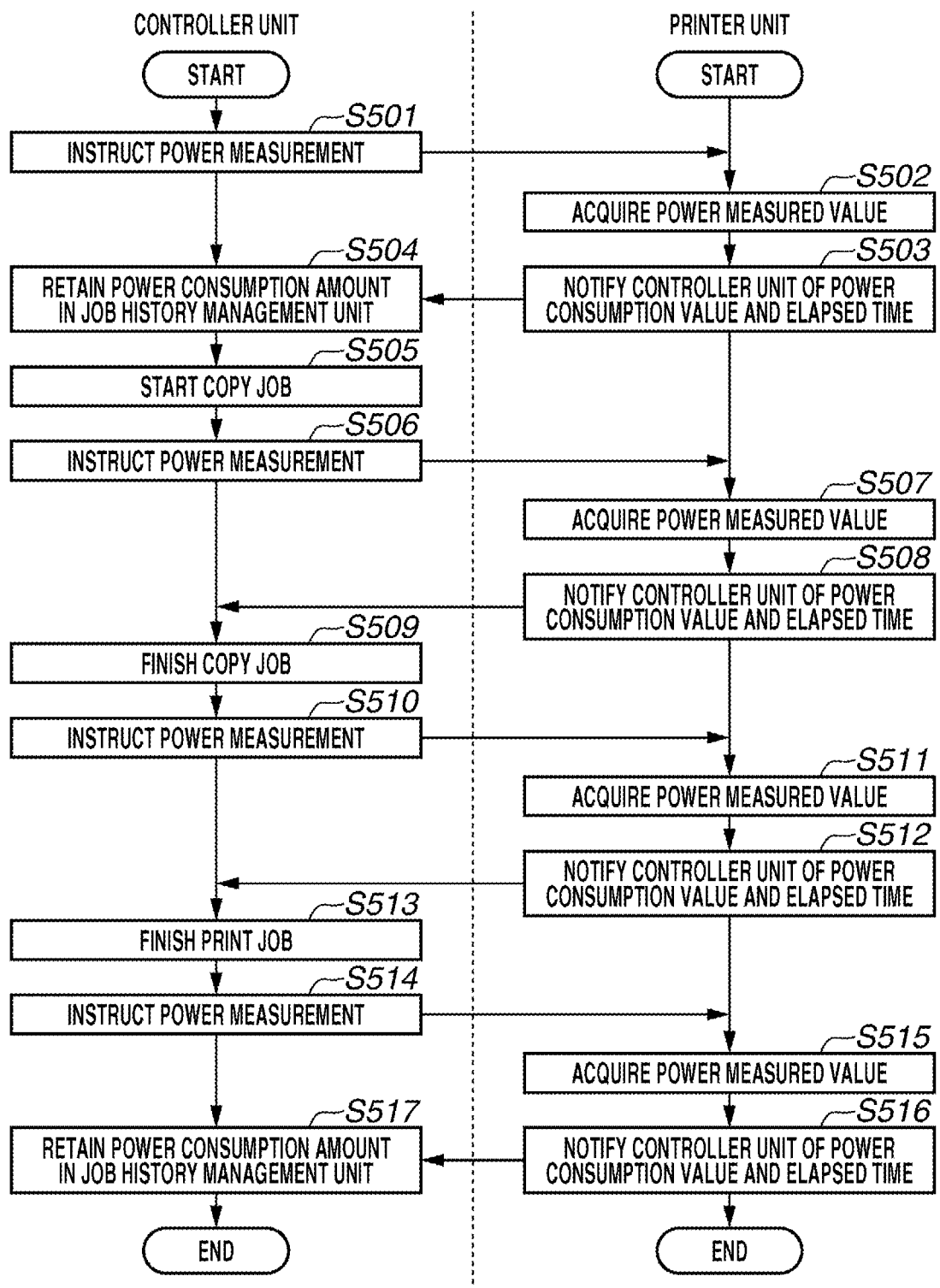
FIG. 18 is a flow chart illustrating the timing of print job/copy job execution and power value acquisition according to a fifth exemplary embodiment of the present invention.

FIG. 18 is a flow chart illustrating the timing of print job/copy job execution and power value acquisition according to the present exemplary embodiment. Processing on the side of the controller unit 1200 in FIG. 18 is realized by a program computer-readably recorded in the HDD 1204 being read and executed by the CPU 1201 of the controller unit 1200. Processing on the side of the printer unit 30 is realized by a program computer-readably recorded in a ROM (not illustrated) or the like being read and executed by the CPU 3001 of the printer unit 30.

In the present exemplary embodiment, in contrast to the first exemplary embodiment, the flow of a case when a power consumption value and an elapsed time are notified from the printer unit 30 and the power consumption amount is calculated by the CPU 1201 of the controller unit 1200 will be described.

Here, an example in which a scan job is executed while a copy job is being processed will be shown. First, when a print job is received, in operation S501, the CPU 1201 of the controller unit 1200 starts the print job and notifies the printer unit 30 of the start of the job via the internal communication I/F 1208 and at the same time, instructs the printer unit 30 to make power measurement. The received job is managed by the job history management unit 1212 and job information of the job is retained in the job history information table (FIG. 2).

In operation S502, the CPU 3001 of the printer unit 30, which has received the instruction of power measurement, acquires measured values of the power measurement unit 50. The acquisition of measured values by the printer unit 30 may occur when a predetermined time passes after reception of the instruction of power measurement. The CPU 3001 of the printer unit 30 stores the acquisition times of the measured values in a storage apparatus (not illustrated) inside the printer unit 30.

After the measured values are acquired, the CPU 3001 of the printer unit 30 calculates power consumption 5-1 by multiplying the voltage level and the current level (voltage level× current level) acquired in operation S502 described above. The CPU 3001 of the printer unit 30 also calculates an elapsed time 5-1 from the time when a power measured value is acquired immediately before (a last measured value acquisition time) to the execution time of operation S502 described above. Further, in operation S503, the CPU 3001 of the printer unit 30 notifies the CPU 1201 of the power consumption value 5-1 together with the elapsed time 5-1 via the internal communication I/F 1208 of the controller unit 1200.

Figure 19:
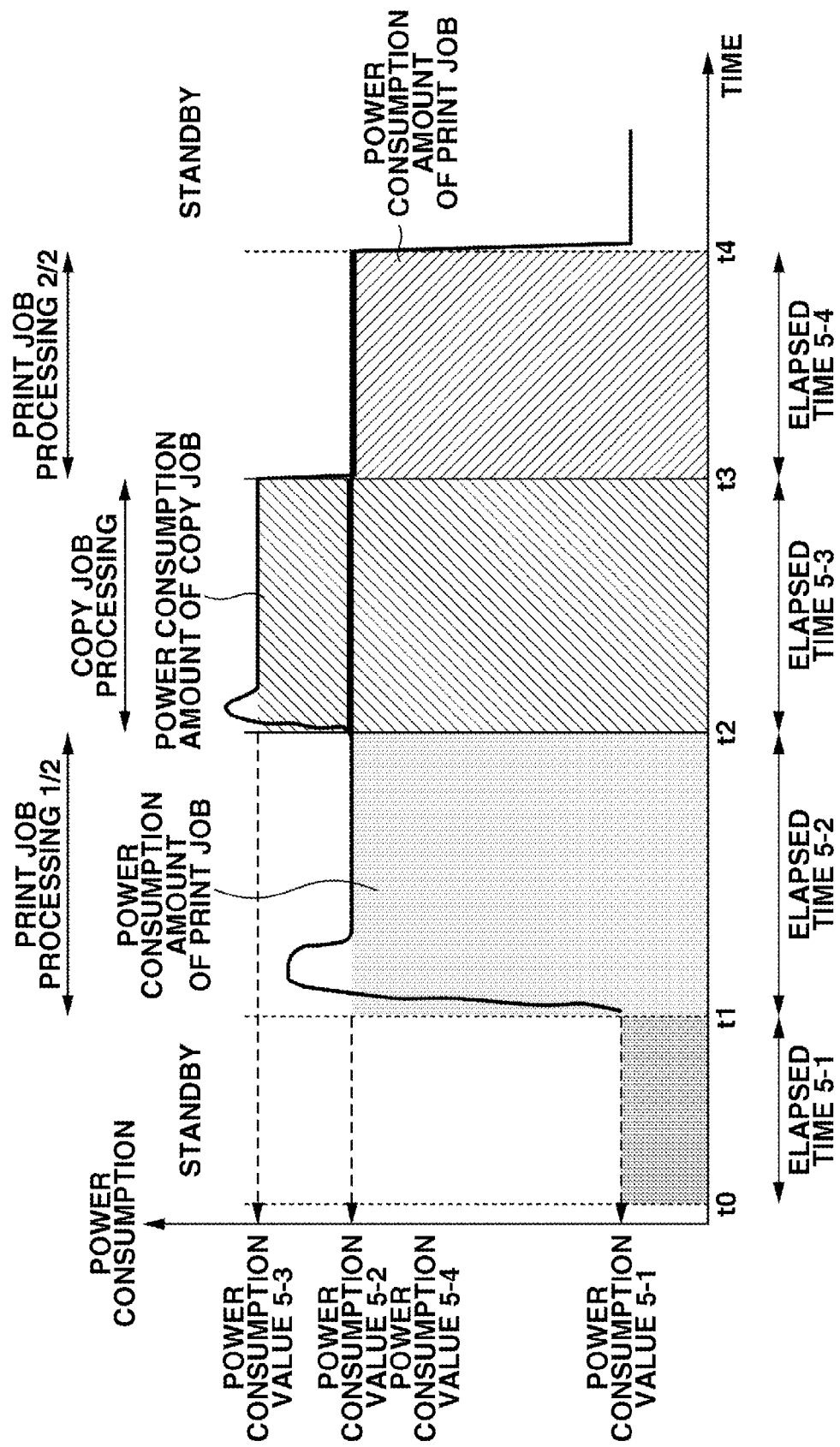
FIG. 19 is a schematic diagram illustrating the relationship between the power consumption of the image forming apparatus and the elapsed time between the start and the end of a job.

FIG. 19 is a schematic diagram illustrating the relationship between the power consumption of the image forming apparatus and the elapsed time between the start and the end of a job. The power consumption value 5-1 and the elapsed time 5-1 illustrated in FIG. 19 are the power consumption value 5-1 and the elapsed time 5-1 of which the controller unit 1200 is notified from the printer unit 30 in operation S503 described above.

The CPU 1201 of the controller unit 1200 calculates the power consumption amount, by multiplying the power (a power consumption value 5-1) and the time (an elapsed time 5-1) (power×time). In operation S504, the CPU 1201 of the controller unit 1200 retains the power consumption amount calculated as described above in the applicable job history of the job history information table of the job history management unit 1212 as the power consumption amount (the inter-job power consumption amount 610) consumed by the image forming apparatus between jobs.

Next, in operation S505, a copy job is started and, when a copy job is received, in operation S506, the CPU 1201 of the controller unit 1200 notifies the scanner unit 20 and the printer unit of the start of the copy job via the internal communication I/F 1208 and at the same time, instructs the printer unit 30 to make power measurement. The received job is managed by the job history management unit 1212 and job information of the job is retained in the job history information table (FIG. 2).

In operation S507, the CPU 3001 of the printer unit 30, which has received the instruction of power measurement, acquires measured values of the power measurement unit 50. The acquisition of measured values by the printer unit 30 may occur when a predetermined time passes after reception of the instruction of power measurement. The CPU 3001 of the printer unit 30 stores the acquisition times of the measured values in a storage apparatus (not illustrated) inside the printer unit 30.

After the measured values are acquired, the CPU 3001 of the printer unit 30 calculates power consumption 5-2 by multiplying the voltage level and the current level (voltage level× current level) acquired in operation S507 described above. The CPU 3001 of the printer unit 30 also calculates an elapsed time 5-2 from the time when a power measured value is acquired immediately before (a last measured value acquisition time, here the time of operation S502) to the execution time of operation S507 described above. Further, in operation S508, the CPU 3001 of the printer unit 30 notifies the CPU 1201 of the power consumption value 5-2 together with the elapsed time 5-2 via the internal communication I/F 1208 of the controller unit 1200.

The power consumption value 5-2 and the elapsed time 5-2 illustrated in FIG. 19 are the power consumption value 5-2 and the elapsed time 5-2 of which the controller unit 1200 is notified from the printer unit 30 in operation S508 described above.

Then, in operation S509, if the CPU 1201 of the controller unit 1200 determines that the copy job is finished, then in operation S510, the CPU 1201 of the controller unit 1200 notifies the scanner unit 20 and the printer unit 30 of the end of the copy job via the internal communication I/F 1208 and at the same time, instructs the printer unit 30 to make power measurement.

In operation S511, the CPU 3001 of the printer unit 30, which has received the instruction of power measurement, acquires measured values of the power measurement unit 50. The acquisition of measured values by the printer unit 30 may occur when a predetermined time passes after reception of the instruction of power measurement. The CPU 3001 of the printer unit 30 stores the acquisition times of the measured values in a storage apparatus (not illustrated) inside the printer unit 30.

After the measured values are acquired, the CPU 3001 of the printer unit 30 calculates power consumption 5-3 by multiplying the voltage level and the current level (voltage level× current level) acquired in operation S511 described above. The CPU 3001 of the printer unit 30 also calculates an elapsed time 5-3 from the time when a power measured value is acquired immediately before (a last measured value acquisition time, here the time of operation S507) to the execution time of operation S511 described above. Further, in operation S512, the CPU 3001 of the printer unit 30 notifies the CPU 1201 of the power consumption value 5-3 together with the elapsed time 5-3 via the internal communication I/F 1208 of the controller unit 1200.

The power consumption value 5-3 and the elapsed time 5-3 illustrated in FIG. 19 are the power consumption value 5-3 and the elapsed time 5-3 of which the controller unit 1200 is notified from the printer unit 30 in operation S512 described above.

Then, in operation S513, if the CPU 1201 of the controller unit 1200 determines that the print job is finished, then in operation S514, the CPU 1201 of the controller unit 1200 notifies the printer unit 30 of the end of the job via the internal communication I/F 1208 and at the same time, instructs the printer unit 30 to make power measurement.

In operation S515, the CPU 3001 of the printer unit 30, which has received the instruction of power measurement, acquires measured values of the power measurement unit 50. The acquisition of measured values by the printer unit 30 may occur when a predetermined time passes after reception of the instruction of power measurement. The CPU 3001 of the printer unit 30 stores the acquisition times of the measured values in a storage apparatus (not illustrated) inside the printer unit 30.

After the measured values are acquired, the CPU 3001 of the printer unit 30 calculates power consumption 5-4 by multiplying the voltage level and the current level (voltage level× current level) acquired in operation S515 described above. The CPU 3001 of the printer unit 30 also calculates an elapsed time 5-4 from the time when a power measured value is acquired immediately before (a last measured value acquisition time, here the time of operation S511) to the execution time of operation S515 described above. Further, in operation S516, the CPU 3001 of the printer unit 30 notifies the CPU

1201 of the power consumption value 5-4 together with the elapsed time 5-4 via the internal communication I/F 1208 of the controller unit 1200.

The power consumption value 5-4 and the elapsed time 5-4 illustrated in FIG. 19 are the power consumption value 5-4 and the elapsed time 5-4 of which the controller unit 1200 is notified from the printer unit 30 in operation S516 described above.

The CPU 1201 of the controller unit 1200 calculates job power consumption amounts of the copy job and the print job from the power consumption value 5-2 and the elapsed time 5-2, the power consumption value 5-3 and the elapsed time 5-3, and the power consumption value 5-4 and the elapsed time 5-4.

Power consumption amount of copy job=(power consumption value 5-3)×(elapsed time 5-3)

Power consumption amount of print job=(power consumption value 5-2)×(elapsed time 5-2)+(power consumption amount 5-4)×(elapsed time 5-4)

In operation S517, the power consumption amount of the copy job and the power consumption amount of the print job calculated by using the above formulas are retained in the applicable job history of the job history information table of the job history management unit 1212 as the respective power consumption amounts (the job power consumption amount 609) consumed by the image forming apparatus 100 in the copy job and the print job. The inter-job power consumption amount 610 of the copy job started during processing of the print job, which is the preceding job, is stored in the job history information table as "0".

The power consumption values and the elapsed times acquired in the fifth exemplary embodiment will be described in detail with reference to FIG. 19. In FIG. 19, t0 is the time when power measurement is made immediately before. t1 is the execution time of S502 in the flow chart in FIG. 18. t2 is the execution time of S507 in the flow chart in FIG. 18. Similarly, t3 and t4 are execution times of operation S511 and operation S515 in the flow chart in FIG. 18, respectively.

When an interrupting job occurs, the image forming apparatus instantaneously enters processing of the interrupting job and thus, the power consumption amount of a copy job and the power consumption amount of a print job may be calculated/measured with high precision using formulas as shown above.

After the processing in FIG. 18, also in the fifth exemplary embodiment, like in the first exemplary embodiment, the job history collection unit 1291 collects the job history according to instructions from the user via the operation unit 10 or the like or at predetermined intervals or the like. Thereafter, the accumulated power consumption amount retaining unit 1292 retains the total power consumption amount. Then, the interface unit 1293 displays/outputs the accumulated power consumption amount according to instructions from the user.

By using the above method, even when a job that may not operate in parallel interrupts during job processing, the power consumption amount of each job may be calculated/measured with high precision while the operation rate of the controller of the image forming apparatus is suppressed.

As a sixth exemplary embodiment of the present invention, two power consumption amount measuring modes (a first mode and a second mode) shown below may be prepared, which are switched by the CPU 1201 of the controller unit 1200.

First mode: mode to reduce the operation rate of the whole image forming apparatus 100 by making measurement of the power consumption value as described in the first exemplary embodiment only in timing instructed by the CPU 1201 of the controller unit 1200.

Second mode: mode in which the power value from the power measurement unit 50 is acquired and the power consumption amount is calculated at regular intervals in the printer unit 30 as described in the third exemplary embodiment and the CPU 1201 of the controller unit 1200 that instructs the printer unit 30 when to send the power consumption amount to reduce the operation rate of the CPU 1201.

Configurations and content of various kinds of data described above are not limited to the above examples and various kinds of configurations and content may naturally be adopted according to uses or purposes.

In the foregoing, the exemplary embodiments have been described, but embodiments of the present invention may take an aspect of, for example, a system, an apparatus, a method, a program, or a storage medium. More specifically, embodiments of the present invention may be applied to a system composed of a plurality of devices or an apparatus composed of one device.

Configurations combining each of the above exemplary embodiments are also all included in the scope of the present invention.

As described above, the power consumption amount for each job may be calculated and measured with high precision while the operation rate of the image forming apparatus is suppressed.

Aspects of the embodiments may also be realized by a computer of a system or apparatus (or devices such as a CPU or MPU) that reads out and executes a program recorded on a memory device to perform the functions of the above-described embodiment(s), and by a method, the operations of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

Further, the present exemplary embodiment may also be realized by supplying software (e.g., a program or a set of instructions) for realizing the functions of the above exemplary embodiments to a system or an apparatus via a network or via various storage media, and having a computer (a central processing unit (CPU) or a micro processing unit (MPU)) of the system or apparatus read and execute the program or the instructions recorded/stored on an article of manufacture having a memory device or a non-transitory storage medium to perform operations or functions of the above-described embodiments. In this case, this program and the recording medium on which the program is recorded/stored constitute one disclosed aspect of the embodiments. In addition, the program may be executed by one computer, or by a plurality of computers linked together.

Disclosed aspects of the embodiments may be realized by an apparatus, a machine, a method, a process, or an article of manufacture that includes a non-transitory storage medium having a program or instructions that, when executed by a machine or a processor, cause the machine or processor to perform operations as described above. The method may be a computerized method to perform the operations with the use of a computer, a machine, a processor, or a programmable device. The operations in the method involve physical objects or entities representing a machine or a particular apparatus (e.g. a data processing apparatus,). In addition, the operations in the method transform the elements or parts from one state to another state. The transformation is particularized and focused on managing power consumption information. The transformation provides a different function or use such as inputting a job, processing the input job, calculating power consumption information, etc.

In addition, elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any optical, electromechanical, electromagnetic, or electronic devices. The term software generally refers to a logical structure, a method, a procedure, a program, a routine, a process, an algorithm, a formula, a function, an expression, etc. A software implementation typically includes realizing the above elements (e.g., logical structure, method, procedure, program) as instruction codes and/or data elements embedded in one or more storage devices and executable and/or accessible by a processor, a CPU/MPU, or a programmable device as discussed above. The term firmware generally refers to a logical structure, a method, a procedure, a program, a routine, a process, an algorithm, a formula, a function, an expression, etc., that is implemented or embodied in a hardware structure (e.g., flash memory). Examples of firmware may include microcode, writable control store, micro-programmed structure. When implemented in software or firmware, the elements of an embodiment may be the code segments to perform the necessary tasks. The software/firmware may include the actual code to carry out the operations described in one embodiment, or code that emulates or simulates the operations.

All or part of an embodiment may be implemented by various means depending on applications according to particular features, functions. These means may include hardware, software, or firmware, or any combination thereof. A hardware, software, or firmware element may have several modules or units coupled to one another. A hardware module/unit is coupled to another module/unit by mechanical, electrical, optical, electromagnetic or any physical connections. A software module/unit is coupled to another module by a function, procedure, method, subprogram, or subroutine call, a jump, a link, a parameter, variable, and argument passing, a function return, etc. A software module/unit is coupled to another module/unit to receive variables, parameters, arguments, pointers, etc. and/or to generate or pass results, updated variables, pointers, etc. A firmware module/unit is coupled to another module/unit by any combination of hardware and software coupling methods above. A hardware, software, or firmware module/unit may be coupled to any one of another hardware, software, or firmware module/unit. A module/unit may also be a software driver or interface to interact with the operating system running on the platform. A module/unit may also be a hardware driver to configure, set up, initialize, send and receive data to and from a hardware device. An apparatus may include any combination of hardware, software, and firmware modules/units.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-237100 filed Oct. 22, 2010, which is hereby incorporated by reference herein in its entirety.

What is claimed is:

1. A data processing apparatus, comprising:
an input unit configured to input a job to be executed by the data processing apparatus;
a processing unit configured to process the job input by the input unit;
a power measurement unit configured to measure power consumption of the data processing apparatus;
a storage unit configured to store a measurement time of the power consumption by the power measurement unit;
a control unit configured to calculate first power consumption information indicating a power consumption amount, obtained while processing by the processing unit is not performed, by using the power consumption measured by the power measurement unit when the processing of the job by the processing unit is started and an elapsed time from the measurement time when the processing of a processed job processed immediately before is finished to the measurement time when the processing of the job is started, and to calculate second power consumption information indicating a power consumption amount, obtained during the processing of the job, by using the power consumption measured by the power measurement unit when the processing of the job is finished and an elapsed time from the measurement time when the processing of the job is started to the measurement time when the processing of the job is finished; and
a job history management unit configured to manage the first power consumption information and the second power consumption information calculated by the control unit.

2. The data processing apparatus according to claim 1, wherein, when a plurality of jobs is executed in parallel, the control unit is configured to calculate the first power consumption information by using the power consumption measured by the power measurement unit when the processing of a preceding job is started and an elapsed time from the measurement time when the processed job processed immediately before the processing of the preceding job is started is finished to the measurement time when the preceding job is started, and
to calculate the second power consumption information of each job by using the power consumption measured by the power measurement unit when the processing of a subsequent job is started, the power consumption acquired when each job is finished, and an elapsed time between the measurement times of the respective jobs.

3. The data processing apparatus according to claim 2, wherein, if the processing of the subsequent job is finished before the processing of the preceding job is finished, the control unit is configured to calculate the second power consumption information of the preceding job by adding a value obtained by multiplying the power consumption measured by the power measurement unit when the processing of the subsequent job is started by an elapsed time from the measurement time when the processing of the preceding job is started to the measurement time when the processing of the subsequent job is finished and a value obtained by multiplying the power consumption measured when the processing of the preceding job is finished by an elapsed time from the measurement time when the processing of the subsequent job is finished to the measurement time when the processing of the preceding job is finished, and to calculate the second power consumption information of the subsequent job by multiplying a value obtained by subtracting the power consumption measured when the processing of the subsequent job is started from the power consumption measured when the processing of the subsequent job is finished by an elapsed time from the measurement time when the processing of the subsequent job is started to the measurement time when the processing of the subsequent job is finished.

4. The data processing apparatus according to claim 2, wherein, if the processing of the subsequent job is finished after the processing of the preceding job is finished, the control unit is configured to calculate the second power consumption information of the preceding job by multiplying the power consumption measured by the power measurement unit when the processing of the subsequent job is started by an elapsed time from the measurement time when the processing of the preceding job is started to the measurement time when the processing of the preceding job is finished, and to calculate the second power consumption information of the subsequent job by adding a value obtained by multiplying a value obtained by subtracting the power consumption measured by the power measurement unit when the processing of the subsequent job is started from the power consumption measured by the power measurement unit when the processing of the preceding job is finished by an elapsed time from the measurement time when the processing of the subsequent job is started to the measurement time when the processing of the preceding job is finished and a value obtained by multiplying the power consumption measured by the power measurement unit when the processing of the subsequent job is finished by an elapsed time from the measurement time when the processing of the preceding job is finished to the measurement time when the processing of the subsequent job is finished.

5. The data processing apparatus according to claim 1, wherein the control unit is configured to calculate, if another job interrupts and is performed during the processing of the job, the first power consumption information by using the power consumption measured by the power measurement unit when the processing of the interrupted job is started and an elapsed time from the measurement time when the processing of a processed job processed immediately before the processing of the interrupted job is started is finished to the measurement time when the processing of the interrupted job is started, and to calculate the second power consumption information of each job by using the power consumption measured by the power measurement unit when the processing of the interrupting job is started, the power consumption measured by the power measurement unit when the processing of each job is finished, and an elapsed time between the measurement times of the respective jobs.

6. The data processing apparatus according to claim 5, wherein the control unit is configured to calculate the second power consumption information of the interrupted job by adding a value obtained by multiplying the power consumption measured by the power measurement unit when the processing of the interrupting job is started by an elapsed time from the measurement time when the processing of the interrupted job is started to the measurement time when the processing of the interrupting job is started and a value obtained by multiplying the power consumption measured by the power measurement unit when the processing of the interrupted job is finished by an elapsed time from the measurement time when the processing of the interrupting job is finished to the measurement time when the processing of the interrupted job is finished, and to calculate the second power consumption information of the interrupting job by multiplying the power consumption measured by the power measurement unit when the processing of the interrupting job is finished by an elapsed time from the measurement time when the processing of the interrupting job is started to the measurement time when the processing of the interrupting job is finished.

7. A data processing apparatus, comprising:
an input unit configured to input a job to be executed by the data processing apparatus;
a processing unit configured to process the job input by the input unit;
a power measurement unit configured to measure power consumption of the data processing apparatus;
an integrating unit configured to make power measurement at regular intervals via the power measurement unit and to calculate and integrate a power consumption amount of the data processing apparatus based on the power measurement;
a control unit configured to acquire, from the integrating unit, the power consumption amounts when processing of the job by the processing unit is started and finished, to set the power consumption amount acquired when the processing of the job is started as the power consumption amount obtained while the processing by the processing unit is not performed, and to set the power consumption amount acquired when the processing of the job is finished as the power consumption amount obtained during the processing of the job; and
a job history management unit configured to retain first power consumption information acquired by the control unit and indicating the power consumption amount obtained while the processing by the processing unit is not performed and second power consumption amount indicating the power consumption amount obtained during the processing of the job.

8. A data processing apparatus, comprising:
an input unit configured to input a job to be executed by the data processing apparatus;
a processing unit configured to process the job input by the input unit;
a power measurement unit configured to measure power consumption of the data processing apparatus;
a storage unit configured to store a measurement time of the power consumption by the power measurement unit;
a control unit configured to calculate, when a first mode is set, first power consumption information indicating the power consumption amount, obtained while processing by the processing unit is not performed, by using the power consumption measured by the power measurement unit when processing of the job by the processing unit is started and an elapsed time from a measurement time when the processing of a processed job processed immediately before is finished to the measurement time when the processing of the job is started, and to calculate second power consumption information indicating a power consumption amount, obtained during the processing of the job, by using the power consumption measured by the power measurement unit when the processing of the job is finished and an elapsed time from the measurement time when the processing of the job is started to the measurement time when the processing of the job is finished;

a job history management unit configured to manage the first power consumption information and the second power consumption information calculated by the control unit; and an integrating unit configured, when a second mode is set, to make power measurement at regular intervals via the power measurement unit and to calculate and integrate a power consumption amount of the data processing apparatus based on the power measurement, wherein, if the second mode is set, the control unit is configured to acquire the power consumption amounts from the integrating unit when the processing of the job by the processing unit is started and finished, to set the power consumption amount acquired when the processing of the job is started as the first power consumption information, and to set the power consumption amount acquired when the processing of the job is finished as the second power consumption information.

9. The data processing apparatus according to claim 1, further comprising a transmission unit configured to transmit the first power consumption information and the second power consumption information retained by the job history management unit to an information processing apparatus that manages information about power consumption of a plurality of data processing apparatuses.

10. A power consumption amount management method for a data processing apparatus, the power consumption amount management method comprising:

inputting a job to be executed by the data processing apparatus;

processing the input job;

calculating first power consumption information indicating a power consumption amount, obtained while processing of the job is not performed, by using power consumption measured when processing of the job is started and an elapsed time from a measurement time when the processing of a processed job processed immediately before is finished to the measurement time when the processing of the job is started;

calculating second power consumption information indicating a power consumption amount, obtained during the processing of the job, by using the power consumption measured when the processing of the job is started and an elapsed time from the measurement time when the processing of the job is started to the measurement time when the processing of the job is finished; and managing the first power consumption information and the second power consumption information.

* * * * *